US010003587B2

(12) United States Patent
Kobayashi

(10) Patent No.: US 10,003,587 B2
(45) Date of Patent: Jun. 19, 2018

(54) AUTHORITY TRANSFER SYSTEM, METHOD, AND AUTHENTICATION SERVER SYSTEM BY DETERMINING WHETHER ENDPOINTS ARE IN SAME OR IN DIFFERENT WEB DOMAIN

(71) Applicant: CANON KABUSHIKI KAISHA, Tokyo (JP)

(72) Inventor: Makoto Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 14/723,037

(22) Filed: May 27, 2015

(65) Prior Publication Data
US 2015/0350179 A1 Dec. 3, 2015

(30) Foreign Application Priority Data

May 30, 2014 (JP) .................. 2014-112627

(51) Int. Cl.
*H04L 29/06* (2006.01)
*H04L 9/32* (2006.01)
*G06F 21/33* (2013.01)

(52) U.S. Cl.
CPC ............ *H04L 63/08* (2013.01); *G06F 21/335* (2013.01); *H04L 9/3226* (2013.01); *H04L 63/0428* (2013.01); *H04L 63/06* (2013.01); *H04L 63/10* (2013.01)

(58) Field of Classification Search
CPC ............ H04L 9/00; H04L 9/32–9/3297; H04L 63/04–63/0492; H04L 63/08–63/0892; H04L 63/10; H04L 63/06; H04L 63/0428; H04L 9/3226; G06F 15/16–15/18; G06F 21/00; G06F 21/30–21/46; G06F 21/60–21/645; G06F 21/554; G06F 2221/033; G06F 9/00; G06F 21/335; H04N 7/16

USPC ................................ 726/4, 17; 713/155, 168
See application file for complete search history.

(56) References Cited

U.S. PATENT DOCUMENTS

| | | | | |
|---|---|---|---|---|
| 6,192,130 | B1 * | 2/2001 | Otway | G06Q 20/3672 380/1 |
| 2011/0126296 | A1 * | 5/2011 | Moore | H04L 63/0807 726/28 |
| 2012/0210414 | A1 * | 8/2012 | Tamura | H04L 63/0815 726/8 |

FOREIGN PATENT DOCUMENTS

JP 2013-145505 A 7/2013

OTHER PUBLICATIONS

Internet Engineering Task Force (IETF), RFC 6749: The OAuth 2.0 Authorization Framework. Oct. 2012.*

(Continued)

*Primary Examiner* — Ashok Patel
*Assistant Examiner* — Quazi Farooqui
(74) *Attorney, Agent, or Firm* — Canon U.S.A., Inc. IP Division

(57) ABSTRACT

An authority transfer system includes a determination unit configured to determine whether a domain of a service and a domain of an endpoint for allowing a client to acquire authority information are a same domain. An issue unit issues the authority information indicating that an authority of a user with respect to the service is transferred to the client without receiving an instruction to permit a transfer of the authority of the user with respect to the service to the client, if the two domains are determined to be the same domain by the determination unit.

11 Claims, 22 Drawing Sheets

(56) References Cited

OTHER PUBLICATIONS

IETF RFC 6749: The OAuth 2.0 Authorization Framework (attached with the office action).*
IETF RFC 6749: The OAuth 2.0 Authorization Framework.*

* cited by examiner

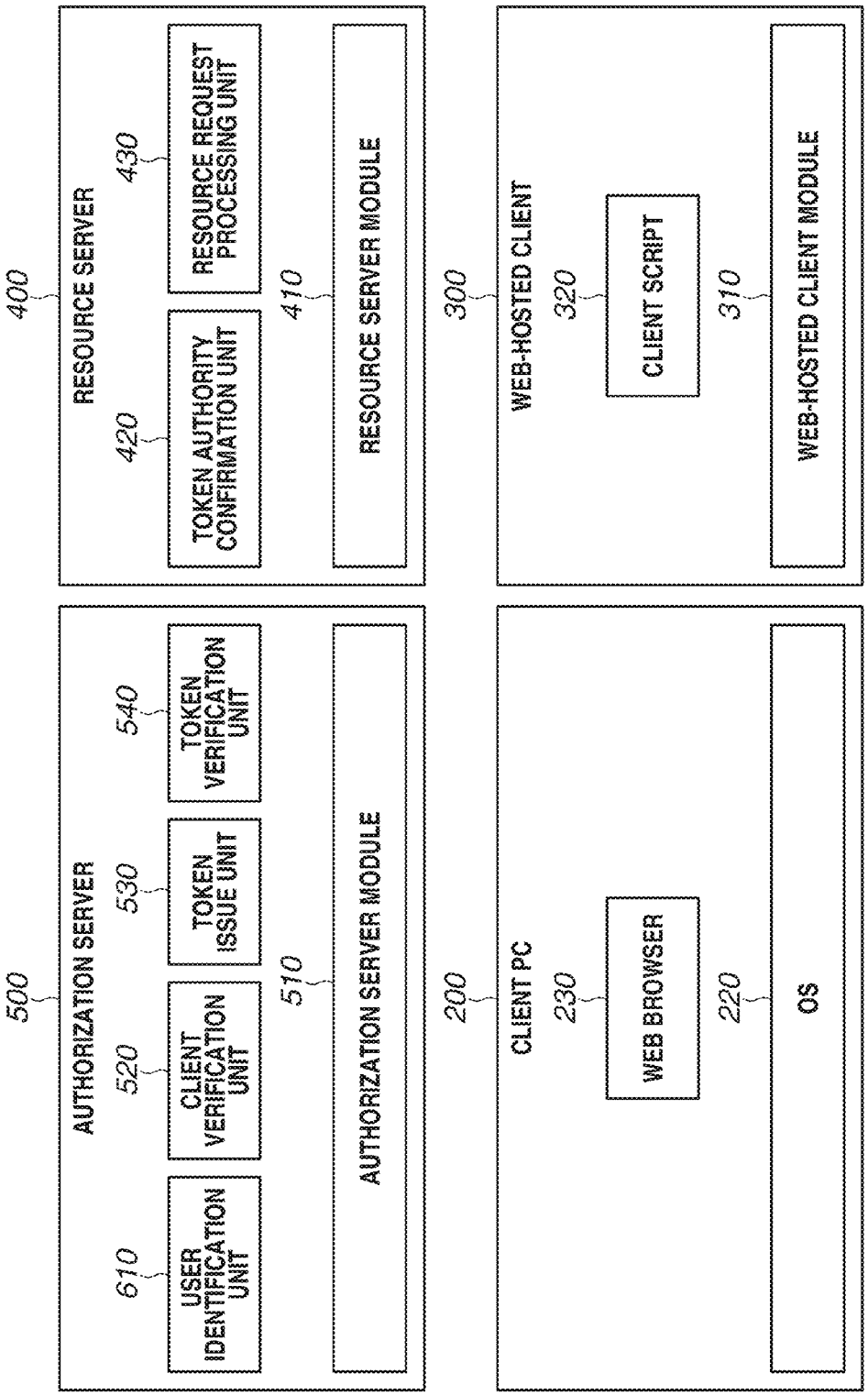

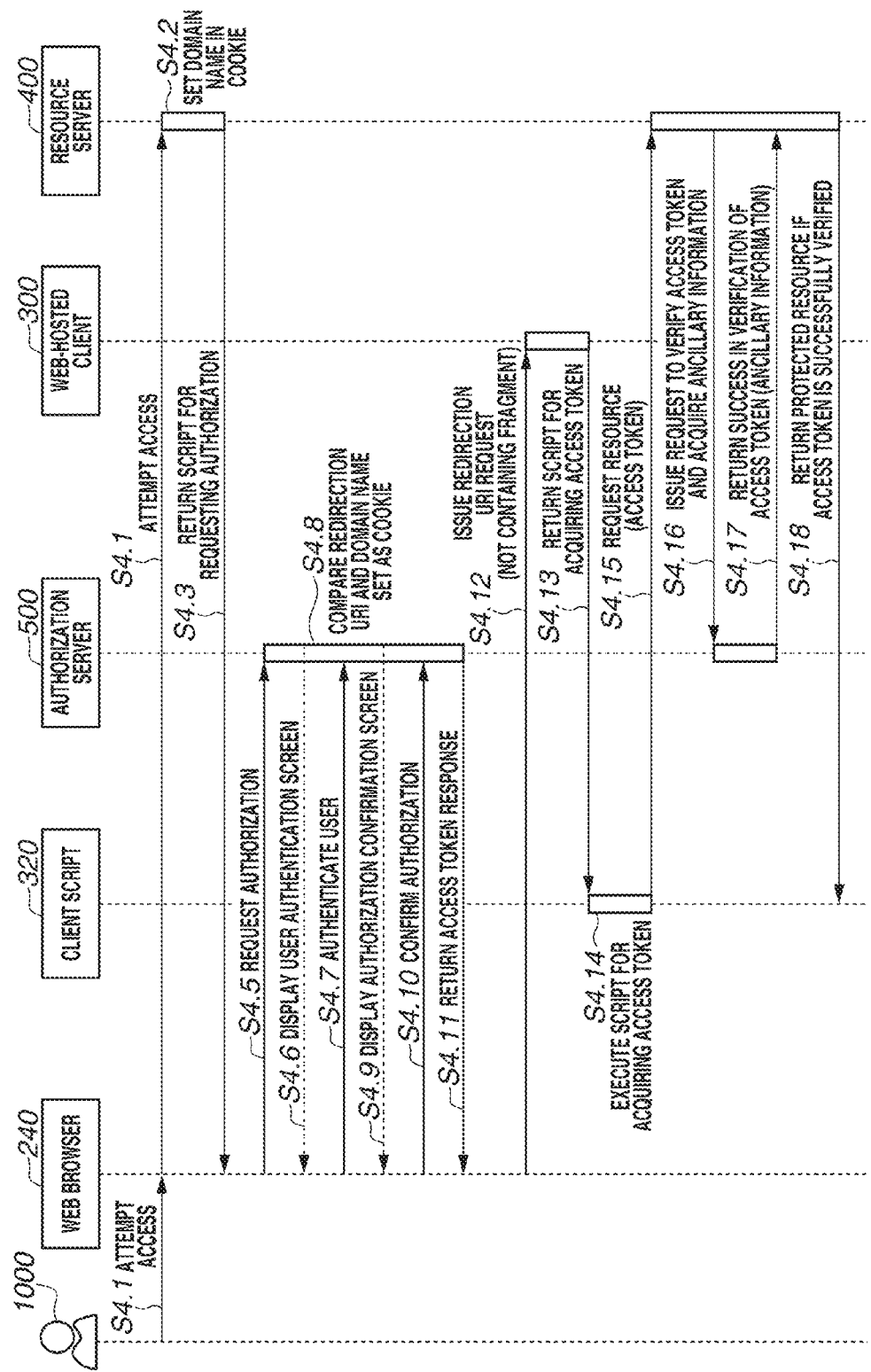

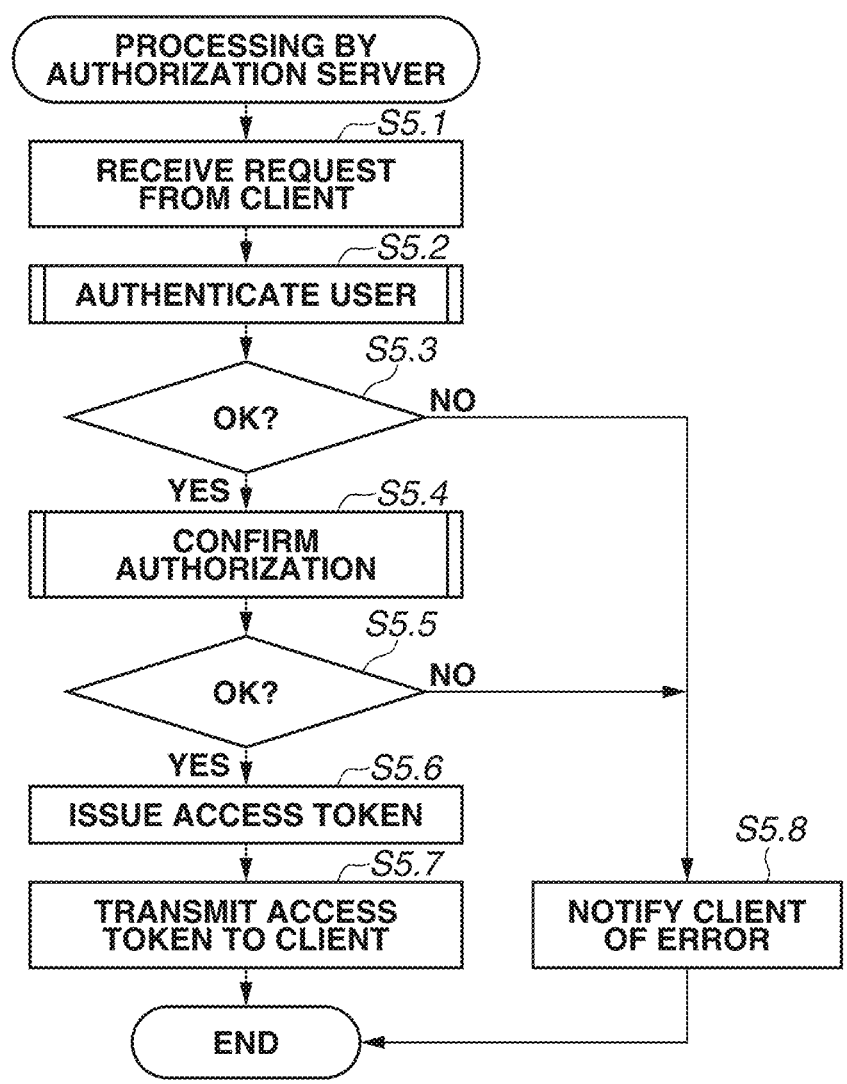

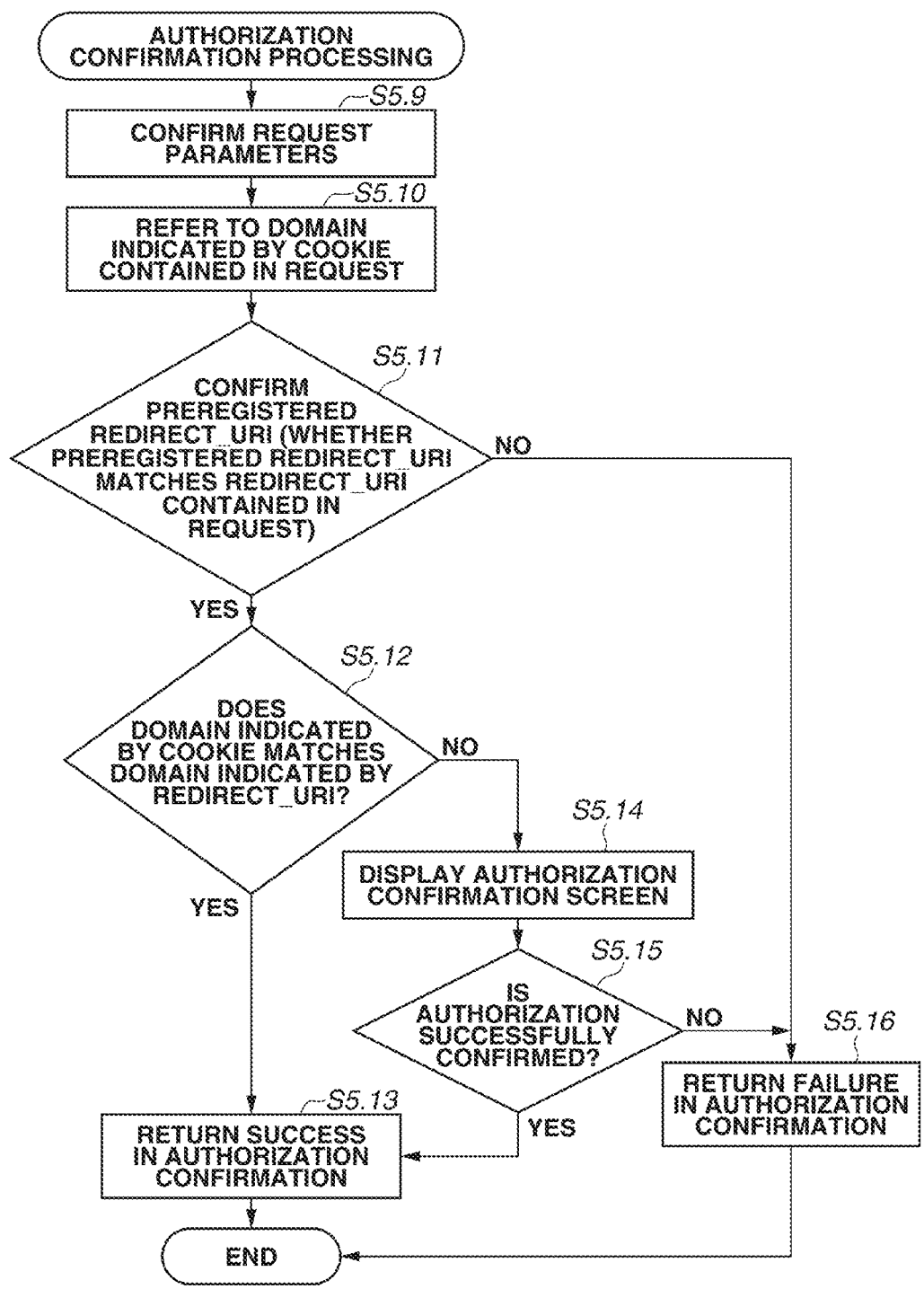

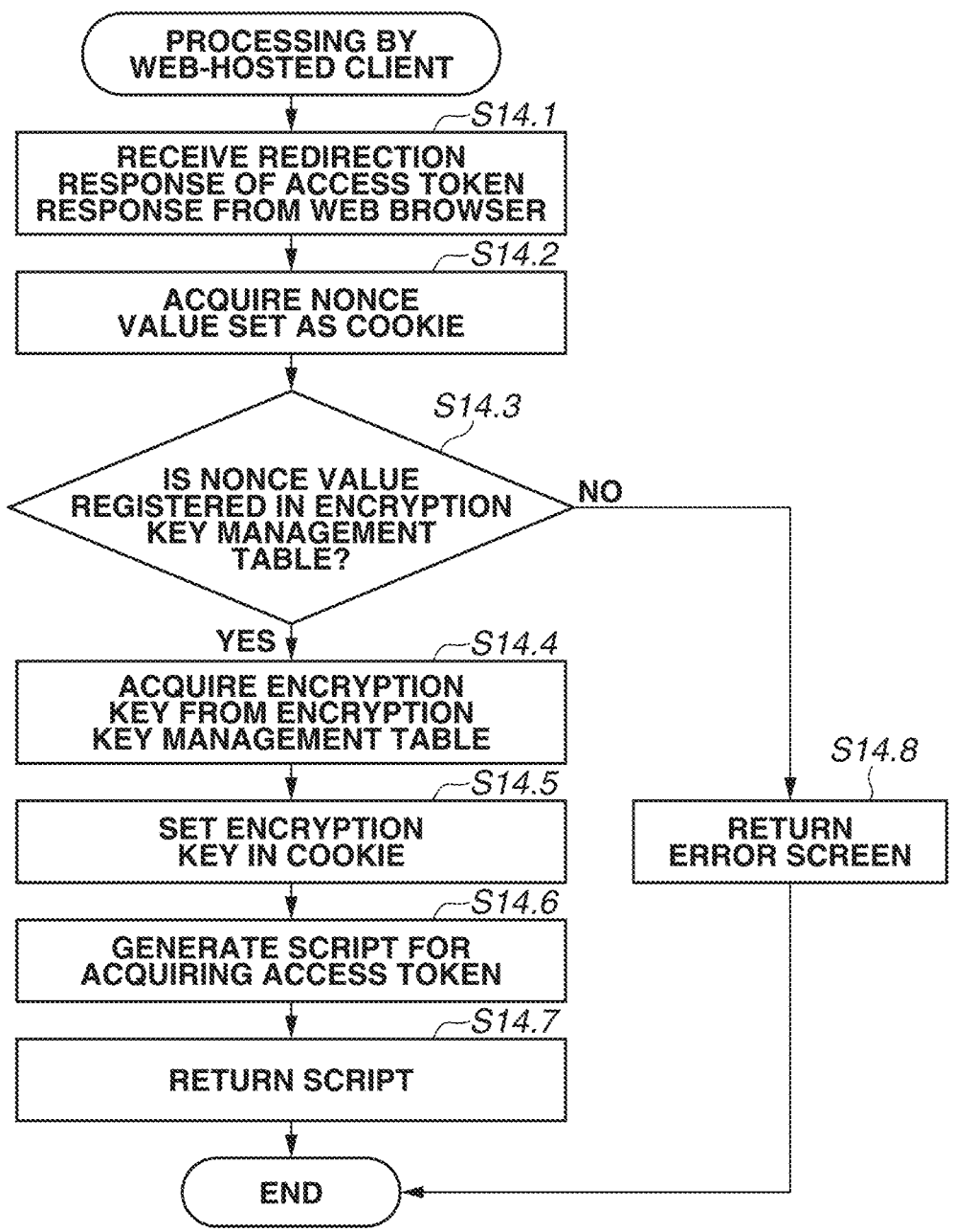

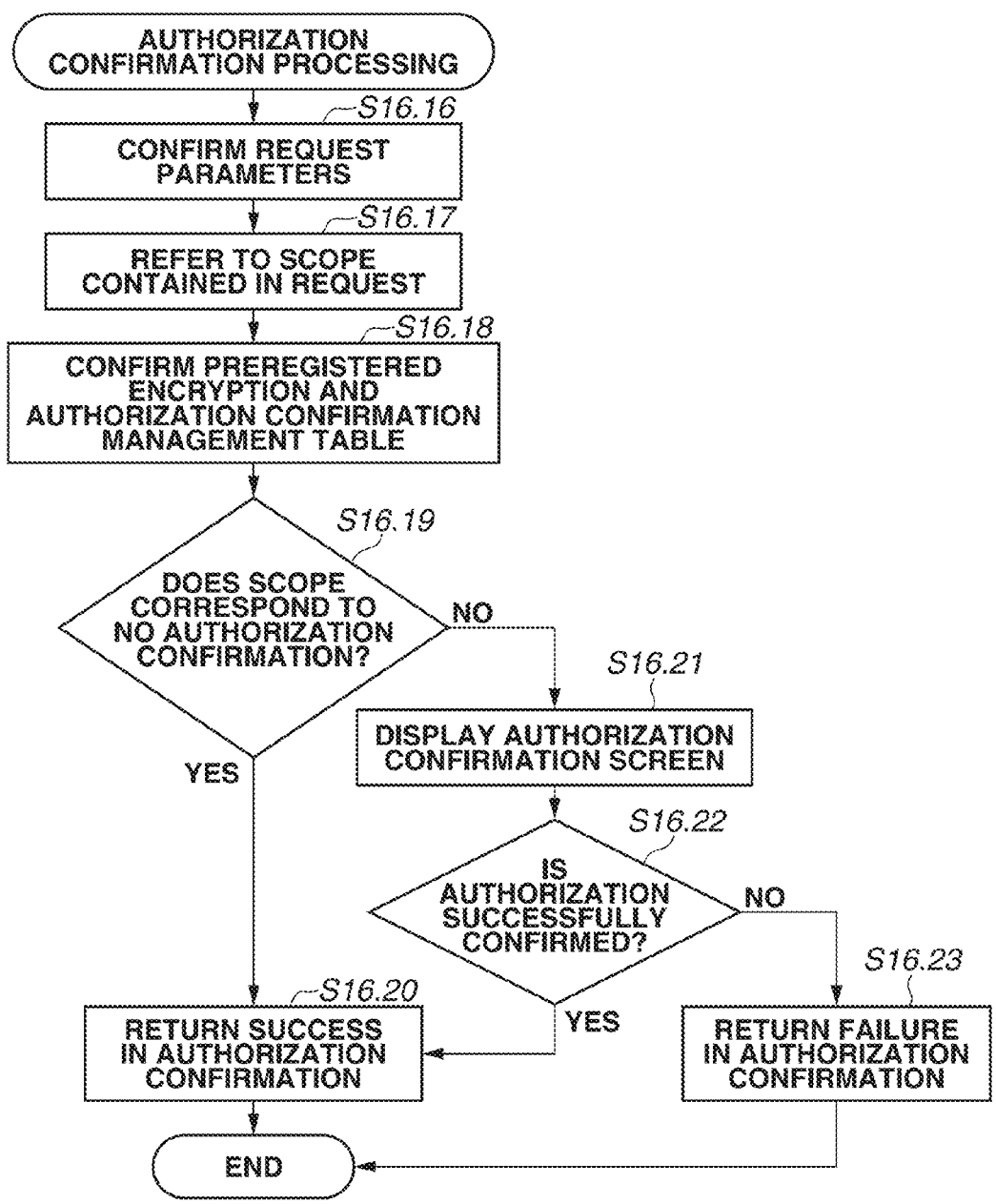

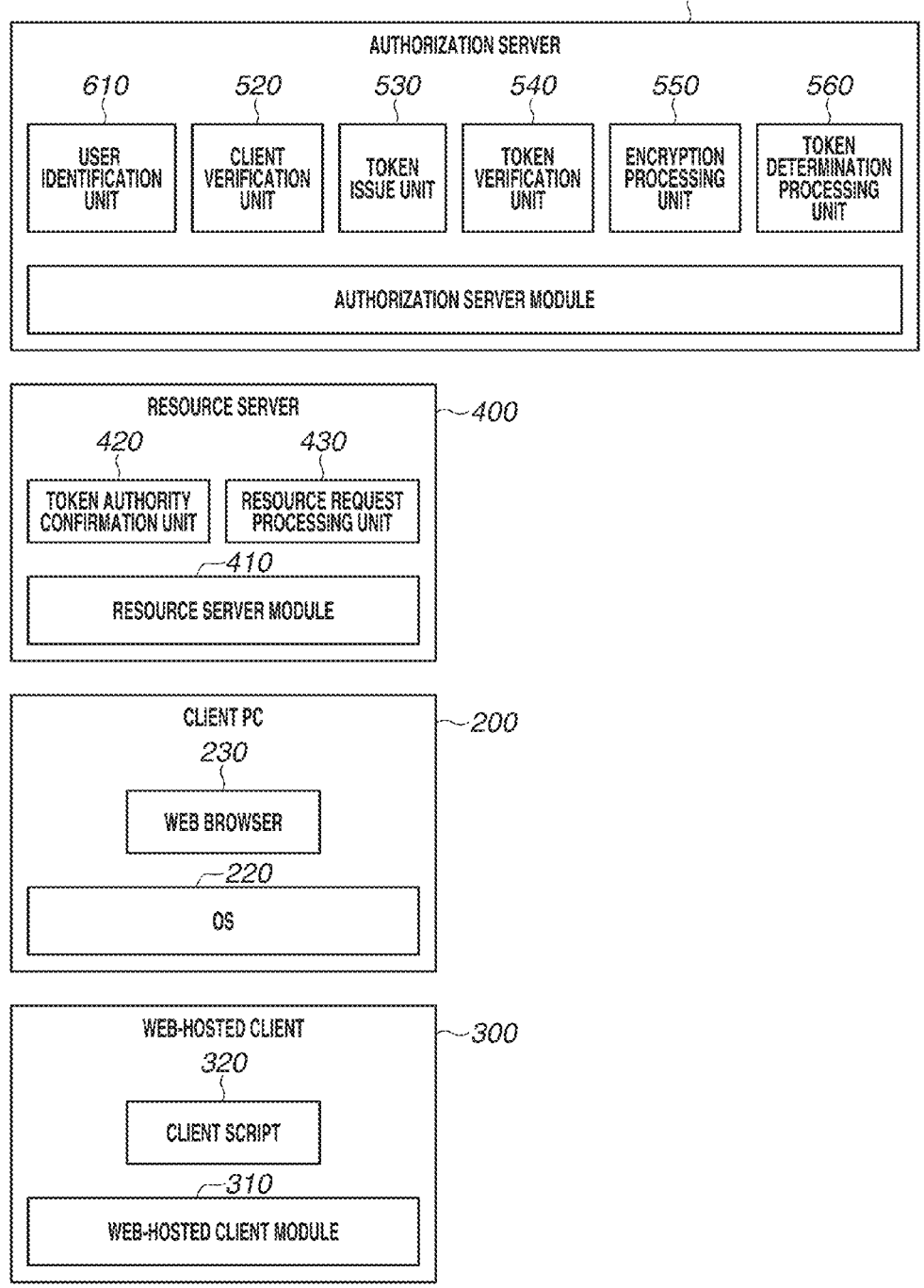

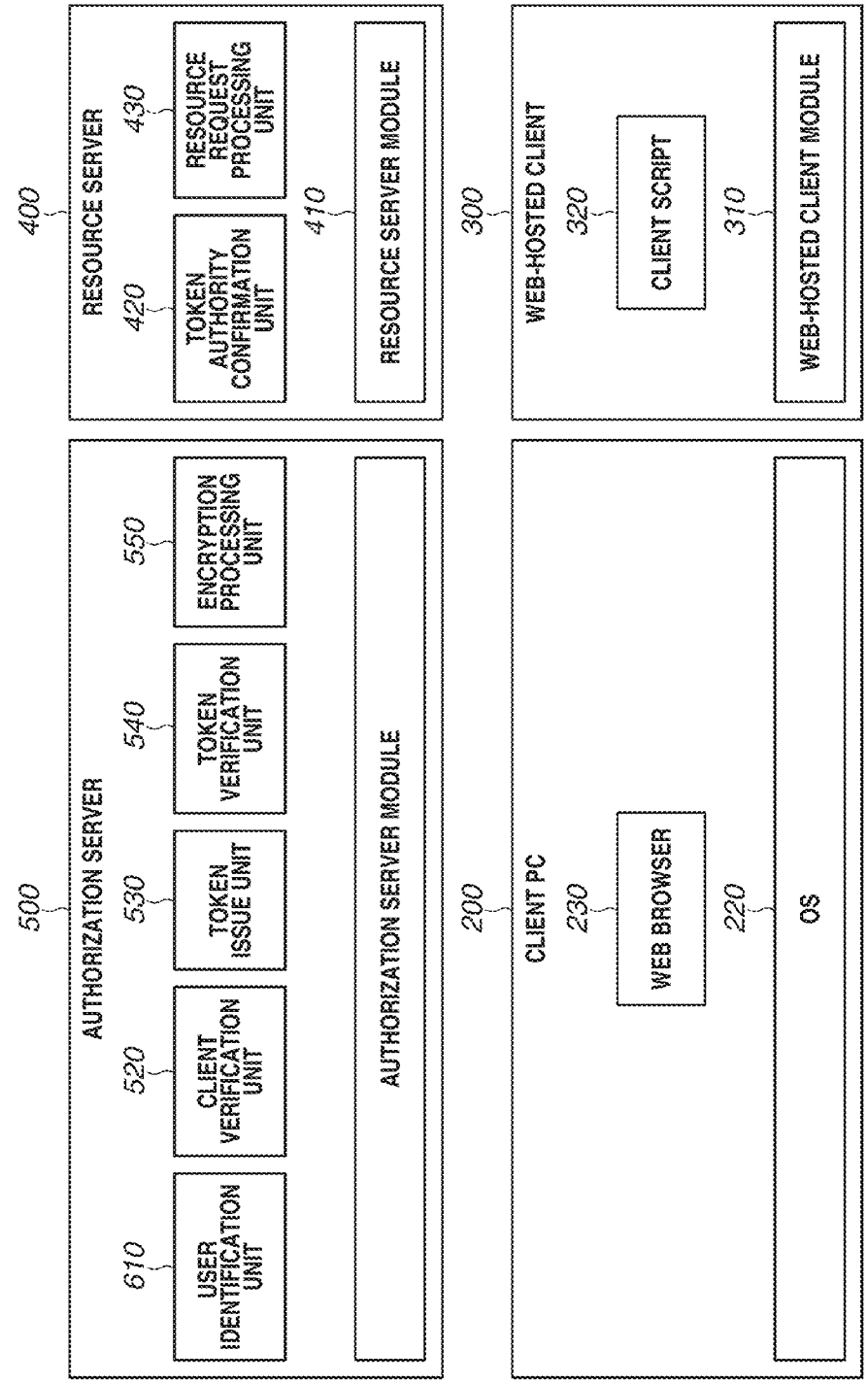

AUTHORITY TRANSFER SYSTEM, METHOD, AND AUTHENTICATION SERVER SYSTEM BY DETERMINING WHETHER ENDPOINTS ARE IN SAME OR IN DIFFERENT WEB DOMAIN

BACKGROUND OF THE INVENTION

Field of the Invention

The present invention relates to an authority transfer system, a method, and an authentication server system for authorizing a transfer of a user's authority to another entity.

Description of the Related Art

In recent years, there have been provided, for example, a service that generates an electronic document in Portable Document Format (PDF) on the Internet, and a service that stores electronic documents on the Internet. Use of such services allows a user to generate a PDF document even if a terminal owned by the user itself does not have a PDF generation function, and to also store electronic documents beyond the storage capacity of the terminal. Further, the recent popularization of cloud computing has led to a further increase in opportunities to create an added value from cooperation between a plurality of services, like the above-described services. A service provider can provide the user with the added value from the cooperation between the services. For example, the user becomes able to even store the generated electronic document in the PDF format directly on the Internet without transferring it via the terminal owned by the user. On the other hand, the cooperation between the services raises several problems.

More specifically, such cooperation involves an exchange of more information than desired by the user between the services, thereby posing a risk of leakage of user data and personal information. For example, a plurality of services exists on the Internet, and the service cooperation is achieved between various services. It is, however, undesirable that a service other than a service that provides a result desired by the user acquires the user data, the personal information, and the like. On the other hand, for the service provider, an easily implementable mechanism is favorable as the mechanism for the service cooperation.

Under these circumstances, there has been formulated a standard protocol for realizing cooperation of an authorization, called Open Authorization (OAuth). Japanese Patent Application Laid-Open No. 2013-145505 discusses a technique for issuing an access token with use of OAuth.

According to OAuth, for example, user's data managed by a service A can be accessed by an external service B authorized by this user. At this time, the service A is supposed to acquire a user's explicit authorization to the access by the external service B after clearly indicating a range to be accessed by the external service B. The term "authorization operation" is used to refer to a user's operation of explicitly granting the authorization.

Once the user performs the authorization operation, the external service B receives a token proving that the access is authorized (hereinafter referred to as the access token) from the service A. The access after that can be realized with use of this access token. At this time, the use of the access token enables the external service B to access the service A under an authority of the user having granted the authorization without information indicating that the user is authenticated. Thus, the external service B authorized by the user and having acquired the access token bears a responsibility to strictly and properly manage this access token.

Further, some of recent devices provide the user with the added value by cooperating with a cloud service using OAuth. For example, there are services called social networking services (hereinafter referred to as "SNSs"). These services can be used from a smartphone. There are various SNSs, and installation of a particular application into the smartphone and use of the application may facilitate use of such an SNS. For example, a user who wants to periodically post the user's location to the SNS may feel convenient by using a positioning function of the smartphone and using an application that periodically measures a position and posts information to the SNS. At this time, the application installed in the smartphone operates to access the SNS on behalf of the user. OAuth may be used in such a case. The user becomes able to use the SNS via the application by permitting the application to perform a minimum function required for using the SNS, for example, posting an article.

On the other hand, a flow for acquiring the access token that is called an implicit grant is defined in OAuth. The implicit grant is optimized for a client implemented on a browser with use of a script language such as JavaScript (registered trademark). The client based on the implicit grant type does not receive an authorization code, which is an intermediate credential for acquiring the access token, but directly receives the access token after being authorized by a resource owner. This grant type is called the implicit grant due to no use of the intermediate credential that mediates the acquisition of the access token, such as the authorization code. Currently, there is also performed such implementation that, when the above-described service is used from a web browser, a login session is succeeded to with use of a cookie or the like as information indicating that the user is authenticated without explicitly carrying out authorization confirmation like OAuth. Further, currently, a configuration that uses a service cooperating with the cloud service based on Application Programming Interface (API) access using jQuery or the like even from the web browser is becoming a de facto standard. The reason behind that is an influence of such a trend that mobile apparatuses have become widely used and browser operating systems (OSs) have appeared.

SUMMARY OF THE INVENTION

According to an aspect of the present invention, an authority transfer system, which includes a server system having a service usable from a client and the client configured to use the service, includes an authentication unit configured to determine whether a user is a valid user based on authentication information input from the user via an authentication screen displayed on the client, an issue unit configured to issue authority information indicating that an authority of the user with respect to the service is transferred to the client if the user determined to be the valid user by the authentication unit provides an instruction to permit a transfer of the authority of the user with respect to the service to the client via an authorization confirmation screen displayed on the client, an authorization unit configured to authorize the client to use the service under the authority of the user based on the authority information transmitted when the client requests use of the service, and a determination unit configured to determine whether a domain of the service and a domain of an endpoint for allowing the client to acquire the authority information are a same domain. The issue unit issues the authority information indicating that the authority of the user with respect to the service is transferred to the client without receiving the instruction to permit the transfer of the authority of the user with respect to the service to the client, if the two domains are determined to be the same domain by the determination unit.

Further features of the present invention will become apparent from the following description of exemplary embodiments with reference to the attached drawings.

BRIEF DESCRIPTION OF THE DRAWINGS

FIG. 3 illustrates a module configuration of each apparatus according to the first exemplary embodiment.

FIG. 4 is a sequence diagram illustrating an authorization flow that allows authorization confirmation to be omitted according to the first exemplary embodiment.

FIGS. 5A and 5B are flowcharts illustrating processing performed by an authorization server according to the first exemplary embodiment.

FIG. 14 is a flowchart illustrating processing performed by a web-hosted client according to the third exemplary embodiment.

FIGS. 16A and 16B are flowcharts illustrating processing performed by an authorization server according to a fourth exemplary embodiment.

FIG. 17 illustrates a module configuration of each apparatus according to the fourth exemplary embodiment.

FIG. 19 illustrates a module configuration of each apparatus according to the third exemplary embodiment.

DESCRIPTION OF THE EMBODIMENTS

The configuration that uses a cloud service based on API access with use of jQuery is becoming a standard method at present, and OAuth is used as an authorization flow at this time. In this case, even if both of a client application and a server application on a cloud are applications provided by a same company, the authorization flow requires the authorization confirmation, which reduces the convenience for users. Another problem is that, for an application using a web browser as a client, the authorization flow also requires the authorization confirmation, which reduces the convenience for users.

One of the objects of the present invention is to propose an authority transfer system that can solve at least one of the above-described problems.

In the following description, exemplary embodiments for embodying the present invention will be described with reference to the drawings.

In the present exemplary embodiments, it is assumed that a form service, which generates form data on the Internet, or a print service, which acquires data on the Internet to print the data, is set in a server on the Internet. Hereinafter, a service that provides a function on the Internet, like the form service and the print service, will be referred to as a "resource service".

Further, in the present exemplary embodiments, it is assumed that a print application or a form application installed on an image forming apparatus uses the resource service. Hereinafter, an application that uses the resource service, like the print application and the form application, will be referred to as a "resource service cooperation application". It is apparent that the resource service is not limited to the form service and the print service, and the application is also not limited to the form application and the print application.

Further, in the present exemplary embodiments, an authority is transferred with use of the OAuth mechanism. The OAuth mechanism uses information called a token, as information for proving an authority transferred from a user. The token is constituted by alphabets and numbers, but the token can be expressed in any manner. Information that indicates the authority transferred from the user to a client, including the token, will be referred to as "authority information" herein.

A first exemplary embodiment will be described as a configuration that skips an authorization confirmation screen in a case where a redirection Uniform Resource Identifier (URI) belongs to a same domain as a client that is a source using a service. Because the client in OAuth is not a service of a third party but is a web browser, performing an authentication operation via the web browser is enough to clarify the source using the service. Further, the web browser and the service can be considered to belong to the same domain. Therefore, the authorization confirmation screen is skipped.

Figure 1:
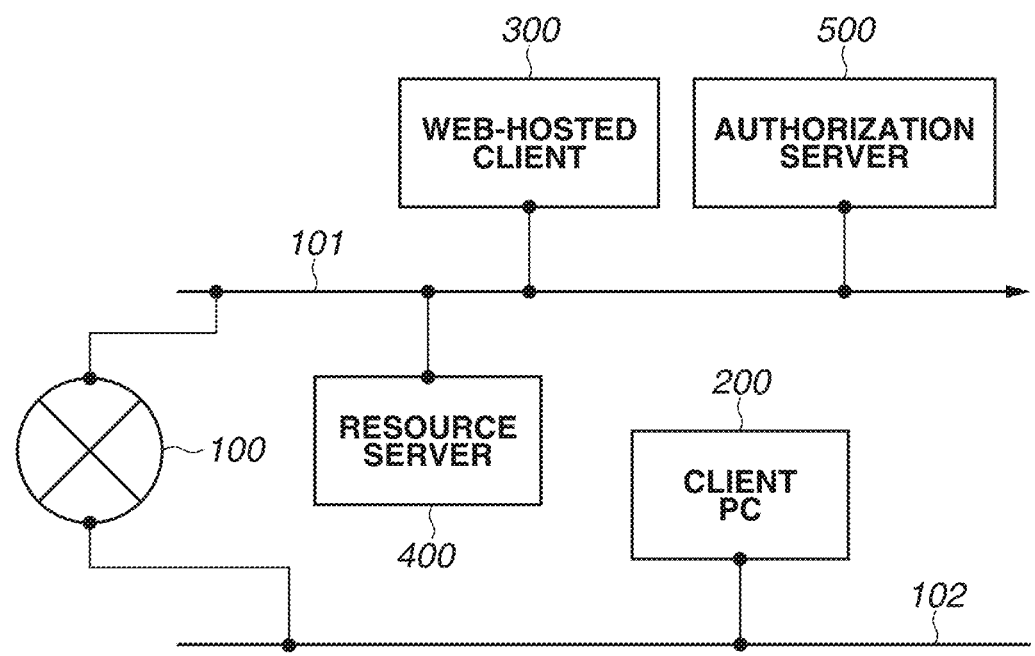
FIG. 1 illustrates a configuration of a system according to a first exemplary embodiment.

An authority transfer system according to the first exemplary embodiment is realized in a network configured as illustrated in FIG. 1. In the present exemplary embodiment, a World Wide Web (WWW) system is constructed based on a wide area network (WAN) 100. Local area networks (LANs) 101 and 102 connect respective components to one another.

An authorization server 500 is a server for realizing OAuth, and an authorization service module is set in the authorization server 500. A web-hosted client resource in OAuth is implemented on a web-hosted client 300. In the present exemplary embodiment, the web-hosted client 300 is specified as a redirection URI that is a destination of an access token response to be provided from the authorization server 500 to a client personal computer (PC) 200. The resource service cooperation application, such as the print service and the form service, is installed in a resource server 400. A single resource server may include a single resource service cooperation application installed therein, or may include a plurality of resource service cooperation applications installed therein. The client PC 200 is operated by the user, and executes a client script, which will be described below, on a web browser on the client PC 200 to use a service such as the print service and the form service with use of the resource in the resource server 400.

The present exemplary embodiment is characterized in that the web-hosted client 300, and the resource server 400 having the service usable from the client PC 200 are connected to the same LAN 101 as the authorization server 500. The web-hosted client 300, the resource server 400, and the authorization server 500 are connected to one another without being connected via the WAN 100. Therefore, the present exemplary embodiment is characterized in that they are considered to belong to a same domain, and service cooperation between the web-hosted client 300 and the resource server 400 is realized by the same authentication. In other words, the authorization server 500 authenticates and authorizes both the web-hosted client 300 and the resource server 400, and this means that the user only has to be authenticated and authorized once to use both of them.

Further, the client PC 200, the web-hosted client 300, and the resource server 400 are connected to each other via the WAN network 100 and the LANs 101 and 102. The client PC 200 and the respective services may be constructed in respective individual LANs, or may be constructed in a same LAN. Further, they may be constructed on a same PC. Further, in the first exemplary embodiment, each of the web-hosted client 300, the resource server 400, and the authorization server 500 will be described as a single server, but each server may be constituted by a group including a plurality of servers. Therefore, the term "server system" is defined to cover both cases of a server being constituted by a single server and a server being constituted by a group including a plurality of servers. Therefore, the term "authentication server system" means an authentication server constituted by a single server or a plurality of servers.

Figure 2:
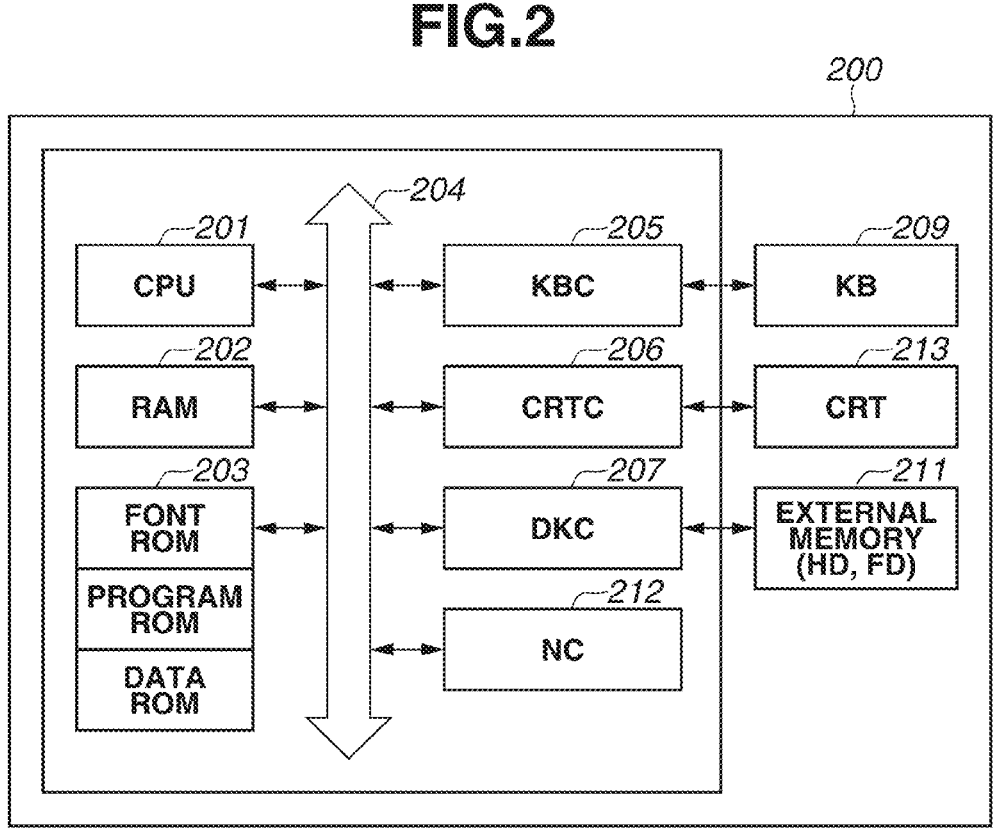
FIG. 2 illustrates a hardware configuration of each apparatus according to the first exemplary embodiment.

FIG. 2 illustrates a configuration of the client PC 200 according to the present exemplary embodiment. Further, server computers of the web-hosted client 300, the resource server 400, and the authorization server 500 are also configured similarly to the client PC 200. Assume that the hardware block diagram illustrated in FIG. 2 corresponds to a hardware block diagram of a general information processing apparatus, and a hardware configuration of the general information processing apparatus can be employed for the client PC 200 and the server computers according to the present exemplary embodiment.

Referring to FIG. 2, a central processing unit (CPU) 201 executes programs such as an OS and an application stored in a program read only memory (ROM) of a ROM 203 or loaded from a hard disk 211 to a random access memory (RAM) 202. The term "OS" is an abbreviation for an operating system that runs on a computer. Hereinafter, the operating system will be referred to as the OS. Processing illustrated in each flowchart that will be described below can be realized by the execution of this program. The RAM 202 functions as, for example, a main memory and a work area for the CPU 201. A keyboard controller (KBC) 205 controls a key input from a keyboard (KB) 209 and a pointing device (not illustrated). A cathode-ray tube controller (CRTC) 206 controls a display on a CRT display 213. A disk controller (DKC) 207 controls data access to the hard disk (HD) 211, a floppy (registered trademark) disk (FD), and the like that store various kinds of data. A network controller (NC) 212 is connected to the network, and performs processing for controlling communication with another apparatus connected to the network.

In all descriptions that will be described below, an executing entity as hardware is the CPU 201, unless otherwise indicated. Further, an executing entity as software, such as a module and an application, is a software function realized by the CPU 201 executing the application program installed in the HD 211.

FIG. 3 illustrates a module configuration of each of the authorization server 500, the resource server 400, the client PC 200, and the web-hosted client 300 according to the present exemplary embodiment. Each module is the software function realized by being executed by the CPU 201.

The authorization server 500 includes an authorization server module 510. The authorization server module 510 includes a user identification unit 601, a client verification unit 520, a token issue unit 530, and a token verification unit 540. The resource server 400 includes a resource server module 410. The resource server module 410 includes a token authority confirmation unit 420, and a resource request processing unit 430. The CPU 201 executes the OS stored in the ROM 202 or an external memory 203, to control each application.

An OS 220 corresponds to this OS, and generally, a real-time OS is used as the OS 220. However, a general-purpose OS such as Linux (registered trademark) may be used in some cases nowadays. Further, the client PC 200 includes a web browser 230, which is a user agent for using the WWW. The web-hosted client 300 includes a web-hosted client module 310. The web-hosted client module 310 has a function of receiving a redirection URI request for redirecting the access token response from the client PC 200, and returning a client script 320 for acquiring an access token and issuing a resource request, which will be described below.

The following tables of Table 1, Table 2, and Table 3 are data tables that the authorization server 500 stores in an external memory. The present exemplary embodiment can be also configured in such a manner that these data tables are stored in another server configured communicably via the LAN 101, instead of being stored in the external memory of the authorization server 500.

TABLE 1

USER MANAGEMENT TABLE

| USER ID | PASSWORD | USER TYPE |
| --- | --- | --- |
| uid00000001 | ********* | USER |
| uid00000002 | ******** | USER |

Table 1 is a user management table. The Table 1 (user management table) includes a user identification (ID), a password, and a user type. The authorization server 500 has a function of verifying a pair of user ID information and password information, i.e., authentication information, and generating information indicating that a user or a client is authenticated if the combination is a valid combination, thereby authenticating each user or each client.

TABLE 2

CLIENT MANAGEMENT TABLE

| CLIENT ID | CLIENT NAME | REDICTION URI |
|---|---|---|
| ztr1JhRGa5 | ************* | https://print_redirect.example.com/redirect |

Table 2 is a client management table. The Table 2 (client management table) includes a client ID, a client name, and a redirection URI. The client ID, the client name, and the redirection URI are values used in an OAuth sequence that will be described below.

TABLE 3

TOKEN MANAGEMENT TABLE

| TOKEN ID | EXPIRATION DATE | SCOPE | CLIENT ID | USER ID |
|---|---|---|---|---|
| AT_000001 | MAY 30, 2014, 11:00.00 | scopeA | dev00000001 | uid00000001 |
| AT_000002 | MAY 30, 2014, 11:00.00 | scopeD | dev00000002 | uid00000002 |

Table 3 is a token management table. The Table 3 (token management table) includes a token ID, an expiration date, a scope, the client ID, and the user ID. The details of processing regarding this Table 3 (token management table) will be described below.

Now, a sequence of an authorization flow performed when the resource service is used with use of the browser application on the client PC 200 will be described with reference to FIG. 4. According to the specification of OAuth 2.0, a plurality of protocol sequences according to various types of clients is called grant types. The authorization flow illustrated in FIG. 4 is a grant type developed by adding a unique extension of the present exemplary embodiment to the implicit grant defined in the specification of OAuth 2.0.

First, in step S4.1, the user issues a request to start an authorization cooperation service that requires access to a protected resource. The user, who is a resource owner 1000, issues this service request to the resource server 400 with use of a Hyper Text Transfer Protocol (HTTP) protocol via the browser application on the client PC 200 that is a user agent operated by the resource owner 1000. More specifically, in step S4.1, the user as the resource owner 1000 operates the client PC 200 to access an application screen (not illustrated) of the resource server 400. This application screen is, for example, a screen for selecting a document to be printed if the resource service cooperation application of the resource server 400 is the print application. On the other hand, the application screen is, for example, a screen for selecting a form to be created if the resource service cooperation application of the resource server 400 is the form application. The access to the application screen at this time means, for example, that the application screen is selectably displayed on the browser on the client PC 200, and the resource owner 1000 selects this application. In step S4.1, the resource owner 1000 transmits the request to start the authorization cooperation service to the resource server 400 by selecting this application.

The present exemplary embodiment is described assuming that the resource service cooperation application exists on the resource server 400. However, generally, the resource service cooperation application may exist on another client application server or the like than the resource server 400. In the present exemplary embodiment, a client application that cooperates with the resource service, such as a print web application and a form web application, is installed as the resource service cooperation application. A single resource server may include a single resource service cooperation application installed therein, or may include a plurality of resource service cooperation applications installed therein.

Next, the resource server 400 receives a start of authorization cooperation according to the request to start the authorization cooperation service in step S4.1. In step S4.2, upon this reception, the resource server 400 sets, in a cookie, a domain that is a domain name of a fully qualified domain name (FQDN) of the resource server 400 to a Uniform Resource Locator (URL) of an authentication endpoint of the authorization server 500 that the resource server 400 has, like "domain=example.com". Then, in step S4.3, the resource server 400 issues a redirection request expressed as the HTTP/1.1 status code 302 to the browser on the client PC 200 so that the browser on the client PC 200 requests an OAuth authorization. An ID of the resource server 400, a type of an authentication flow, and the URL of the authentication endpoint of the authorization server 500 are contained in an HTTP Location header of this redirection request. Therefore, the redirection request is configured in the following manner. https://auth.a01.example.com/authorize?response_type=token& client_id= ztr1JhRGa5&state=xyz&redirect_uri= https%3A%2F%2Fclient%2Eexample%2Ecom%2Fcb&scope=scopeA
HTTP method: GET
Content-Type: application/x-www-form-urlencoded A fixed character string "token", and an application ID of the client application on the resource server 400 that is preregistered with the authorization server 500 as the client application are specified as request parameters "response type" and "client_id", respectively. Further, a URL of the web-hosted client 300 preregistered in the authorization server 500 as the client application is specified as "redirect_uri". In other words, the endpoint of this "redirect_uri" can be considered to be the address of the web-hosted client 300 that generates a script for allowing the client to acquire the access token, which is the authority information. Further, according to OAuth, the redirection request can be also configured in such a manner that a scope indicating an authority range desired to be authorized is contained into an authorization request. In the present exemplary embodiment, the present authorization flow is described assuming that a scope A is requested as the scope.

Figure 6A:
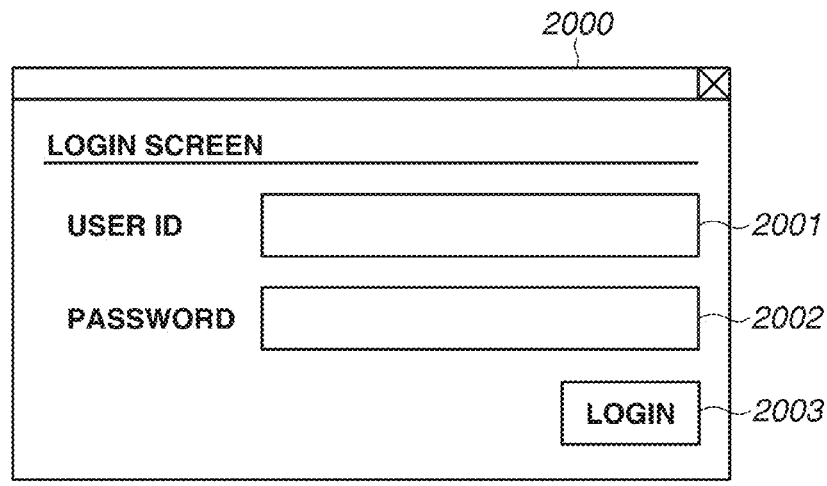
FIGS. 6A, 6B, and 6C illustrate a login screen and an authorization confirmation screen according to the first exemplary embodiment.

Next, in step S4.5, upon receiving the redirection request, the client PC 200 requests the authorization server 500 to authenticate the user and grant an authorization according to the redirection request. In step S4.6, upon receiving the authorization request, the authorization server 500 returns a login screen 2000 illustrated in FIG. 6A to the browser on the client PC 200 to authenticate the user. In step S4.7, the user as the resource owner 1000 inputs a user ID and a password onto the login screen 2000 displayed on the browser on the client PC 200, thereby attempting a login. The authorization server 500 verifies whether the pair of the received user ID and password matches the information registered in the Table 1 (user management table). Now, the display of the user authentication screen (step S4.6), the user authentication (step S4.7), and a comparison between the redirection URI and the domain parameter included in the cookie (step S4.8) will be described with reference to flowcharts illustrated in FIGS. 5A and 5B, which will be described below. Further, a display of an authorization confirmation screen (step S4.9) and an omission of the authorization confirmation (step S4.10), which are characteristic features of the present exemplary embodiment, and the access token response (step S4.11) will be described.

FIG. 5A is a flowchart illustrating processing performed by the authorization server module 510 on the authorization server 500 when the authorization server 500 receives the request to authenticate the user and grant an authorization. In step S5.1, the authorization server module 510 receives the redirection request from the client PC 200, which triggers a start of the present flowchart. The authorization server module 510 returns the login screen 2000 illustrated in FIG. 6A to the browser on the client PC 200 to authenticate the user. In step S4.7, the user as the resource owner 1000 inputs the user ID and the password onto the login screen 2000 displayed on the browser on the client PC 200, thereby attempting a login. In step S5.2, the authorization server 500 verifies whether the pair of the received user ID and password matches the information registered in the Table 1 (user management table). If the pair of the user ID and the password is not registered in the Table 1 (user management table) as a result of the verification (NO in step S5.3), in step S5.8, the authorization server module 510 notifies the client PC 200 of a user authentication error screen (not illustrated), and then ends the processing. If the pair of the user ID and the password is registered in the Table 1 (user management table) as a result of the verification (YES in step S5.3), next, in step S5.4, the authorization server module 510 performs authorization confirmation processing.

FIG. 5B is a flowchart illustrating the authorization confirmation processing performed by the authorization server module 510 on the authorization server 500 according to the present exemplary embodiment. In the present authorization confirmation processing, in step S5.9, the authorization server module 510 confirms the request parameters contained in the redirection request received from the client PC 200 in step S5.1. Further, in step S5.10, the authorization server module 510 acquires the domain parameter included in the cookie contained in the request, for example, "domain=example.com". At this time, in step S5.11, the authorization server module 510 refers to the Table 2 (client management table) to confirm whether the values of the request parameters "client_id" and "redirect_uri" contained in the redirection request are registered in the Table 2 (client management table).

If the values of the request parameters "client_id" and "redirect_uri" contained in the redirection request are not registered in the Table 2 (client management table) at this time (NO in step S5.11), in step S5.16, the authorization server module 510 returns a failure in the authorization confirmation, and then ends the processing. If the values of the request parameters "client_id" and "redirect_uri" contained in the redirection request are registered in the Table 2 (client management table) (YES in step S5.11), next, in step S5.12, the authorization server module 510 refers to the domain parameter included in the cookie acquired in step S5.10, and compares this domain parameter with the domain indicated by the request parameter "redirect_uri" to determine whether they match each other.

In the present exemplary embodiment, the domain parameter included in the cookie is "domain=example.com", whereby "example.com" is acquired as the domain. Further, the request parameter "redirect_uri" is converted into "redirect_uri=https://client.example.com/cb" by URL decoding, whereby "example.com" is acquired as the domain. Therefore, in step S5.13, the authorization server module 510 returns a success in the authorization confirmation without returning the authorization confirmation screen to the client PC 200.

Figure 6B:
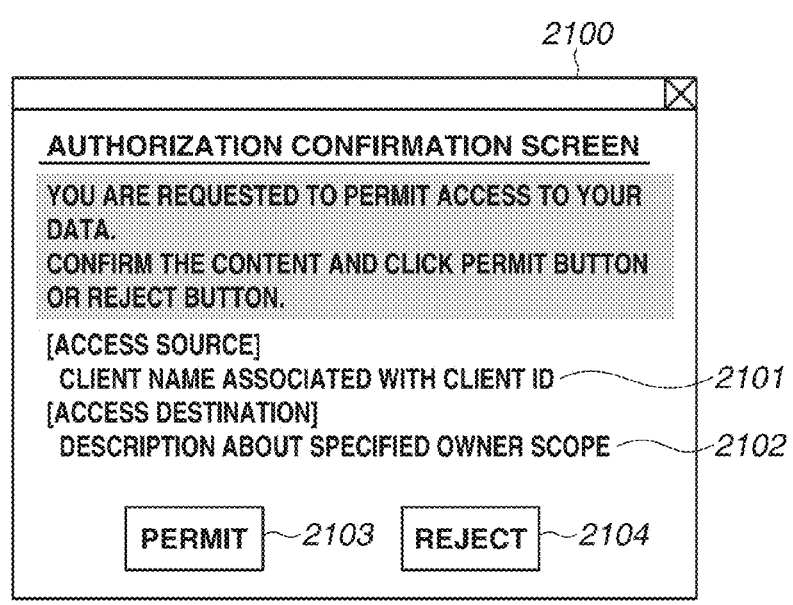
Figure 6C:
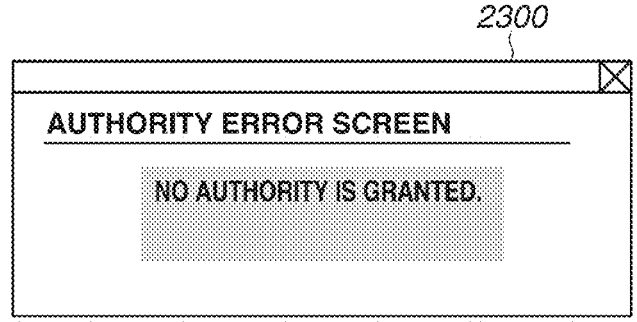

If the domain indicated by the domain parameter included in the cookie and the domain indicated by the request parameter "redirect_uri" are different from each other (NO in step S5.12), in step S5.14, the authorization server module 510 returns an authorization confirmation screen illustrated in FIG. 6B to the client PC 200. Then, the authorization server module 510 waits for a response from the client PC 200. If the authorization confirmation has failed (NO in step S5.15), in step S5.16, the authorization server module 510 returns a failure in the authorization confirmation, and then ends the processing. On the other hand, if the authorization confirmation has succeeded (YES in step S5.15), in step S5.13, the authorization server module 510 returns a success in the authorization confirmation, and then ends the processing.

Referring back to FIG. 5A, if the authorization confirmation has failed (NO in step S5.5) after the end of the authorization confirmation processing illustrated in FIG. 5B (step S5.4), in step S5.8, the authorization server module 510 notifies the client PC 200 of a user authorization error screen (not illustrated), and then ends the processing. If the authorization confirmation (step S5.4) has succeeded (YES in step S5.5), in step S5.6, the authorization server module 510 performs access token issue processing for generating the access token that allows access to the resource server 400.

The authorization server module 510 registers the generated access token into the Table 3 (token management table). More specifically, the authorization server module 510 stores an access token character string "AT_000001" into the token ID. Further, the authorization server module 510 stores an expiration date of the access token that is predetermined by the authorization server 500 into the expiration date. Further, the authorization server module 510 stores scope information and the user ID contained in a record of an authentication token already registered in the token table into the scope and the user ID, respectively. In this manner, in step S5.7, the authorization server 500 issues the access token "AT_000001" that allows resource access to the resource server 400 without requesting the user to explicitly confirm the authorization. This is because the web-hosted client 300, the resource server 400, and the authorization server 500 are connected to one another without being connected via the WAN 100. In the present exemplary embodiment, the LAN 101 is considered to be inside premises, and the web-hosted client 300, the resource server 400, and the authorization server 500 are considered to belong to the same security domain.

The access token response transmitted from the authorization server module 510 to the client PC 200 at this time (step S4.11) is configured according to the specification of OAuth 2.0 in the following manner. More specifically, the authorization server module 510 returns the response to the client PC 200 after adding, for example, the following parameters to a fragment component of the redirection URI with use of the "application/x-www-form-urlencoded" format.

HTTP/1.1 302 Found
Location:
http://client.example.com/cb#access
  token=AT_000001&state=x
  yz&token_type=example&expires_in=3600

In this manner, the parameters added to the access token response are "access_token", "token_type", "expires_in", "scope", and "state" according to the specification of OAuth 2.0. The access token response (step S4.11) returned in the authorization flow according to the implicit grant, like the present exemplary embodiment, is set so as to be first redirected to the web-hosted client 300 realized as a host function to allow the web browser 230 on the client PC 200 to acquire the access token. In step S4.12, upon receiving the access token response, the web browser 230 on the client PC 200 redirects this access token response to the web-hosted client 300. At this time, the redirection in step S4.12 does not contain the parameters in the fragment component according to the HTTP specification.

In step S4.13, upon receiving the redirection, the web-hosted client module 310 of the web-hosted client 300 returns a response containing the script that allows the web browser 230 on the client PC 200 to acquire the access token. Generally, this script is JavaScript (registered trademark) executable on the web browser 230, but may be another script executable on the browser. In step S4.14, the client script 220 running on the web server 201, which has received the script for acquiring the access token, acquires the access token by executing the script. As a result, in step S4.15, the client script 220 can access the resource server 400.

Figure 7:
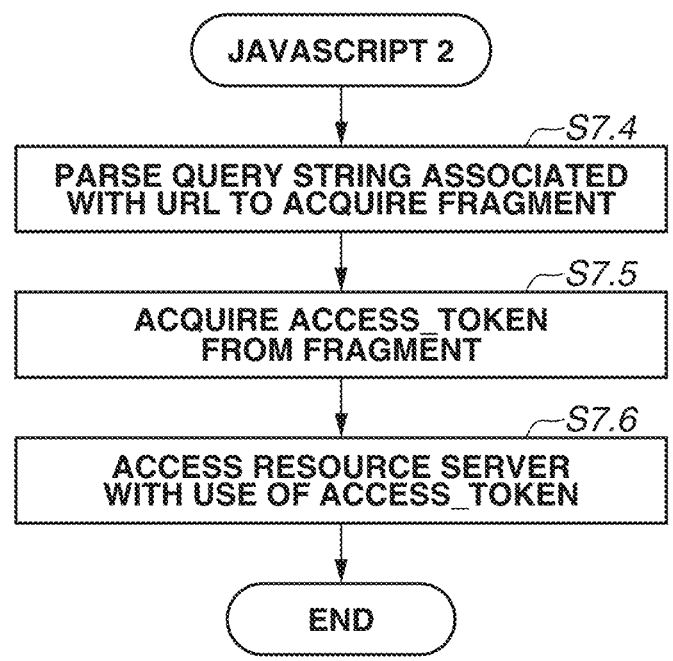
FIG. 7 is a flowchart illustrating processing performed by a script on an authorization client according to the first exemplary embodiment.

FIG. 7 is a flowchart illustrating the script for acquiring the access token to access the resource server 400. Upon receiving the script from the web-hosted client 300, the web browser 230 on the client PC 200 executes the present flowchart. First, in step S7.4, the web browser 230 parses a query string associated with the URI that is the redirection destination of the access token response (step S4.11) to acquire the value of the fragment. For example, according to JavaScript (registered trademark) in the present exemplary embodiment, the web browser 230 acquires the value of the fragment component in the access token response redirected to the web-hosted client 300 with use of the location.hash function. Further, in step S7.5, the web browser 230 acquires the access token "access_token=AT_000001" contained in the acquired fragment component. Then, in step S7.6, the web browser 230 accesses the resource server 400 with use of the acquired access token by executing the present script.

In the steps S4.13 and S4.14, the script running on the web browser 230 receives the access token "AT_000001" and the scope "resource A" according to the flowchart illustrated in FIG. 7. Then, in step S4.15, the script requests resource access to the resource server 400 while setting the access token "AT_000001" and the scope "resource A" in request parameters.

Upon receiving the access token information "AT_000001" and the scope "resource A", the resource server 400 determines whether to permit or reject the access to the resource for which the request is received based on the acquired information. In the present exemplary embodiment, assume that an application ID permitted to access the resource is preset in the resource server 400, and the resource server 400 verifies whether to permit the access by comparing this set application ID and an application ID acquired from the access token information "AT_000001". In step S4.16, the resource server 400 carries out this verification by acquiring token information from the authorization server 500 while setting the access token "AT_000001" and the scope "resource A" as arguments. In step S4.17, the authorization server 500 refers to the Table 3 (token management table) to verify whether the expiration date of the acquired access token "AT_000001" has not yet passed and the requested scope "resource A" is within the scope range. Then, if there is no problem, the authorization server 500 returns a success in the verification. If the resource server 400 determines to permit the access as a result thereof, in step S4.18, the resource server 400 returns the resource to the web browser 230. At this time, the resource is, for example, a list of printable documents if the resource server 400 is the print service, or a list of creatable forms if the resource server 400 is the form service.

The present exemplary embodiment has been described assuming that the verification of the token is carried out by each of the authorization server 500 and the resource server 400 in steps S4.16 and S4.17, but can be also configured in such a manner that the authorization server 500 manages the application permitted to access the resource, and carries out all of the verification processes. Further, the present exemplary embodiment has been described assuming that the resource server 400 determines the application permitted to access the resource with use of the application ID, but can be also configured in such a manner that the resource server 400 identifies the web browser 230 on the client PC 200 based on a serial number or the client ID that can be acquired from the token information to thereby determine whether to permit or reject the access. Further, similarly, the present exemplary embodiment can be also configured in such a manner that the resource server 400 determines whether to permit or reject the access based on the scope and the user ID that can be identified from the token information. In step S4.18, upon receiving the resource response, the web browser 230 on the client PC 200 constructs the application screen based on the received data, and responds to the user as the resource owner 1000.

The first exemplary embodiment is configured in this manner. The present exemplary embodiment allows the authorization operation to be omitted in the authority transfer system in which the web browser plays the role of the client cooperating with the service, and this web browser communicates with the service via the API by using jQuery.

A second exemplary embodiment will be described as a configuration in which the client application acquires the access token while the authorization confirmation screen is skipped in a case where the redirection URI belongs to the same domain. The second exemplary embodiment is configured differently from the method described in the first exemplary embodiment, and will be described in detail below based on an example in which a web application 240 on the client PC 200 acquires the access token without use of the web-hosted client 300. For similar components in the second exemplary embodiment to the first exemplary embodiment, the components in the first exemplary embodiment that should be referred to will be indicated. In the second exemplary embodiment, the web application 240 is assumed to be not a general-purpose web browser, but to be the web application 240 developed by a vendor providing the resource server 400. In other words, the web application 240 and the resource server 400 can be considered to belong to the same domain. This means that, as long as the user is authenticated via the web application 240, an instruction to permit a transfer of the user's authority to this web application 240, i.e., the authorization operation can be omitted.

Figure 8:
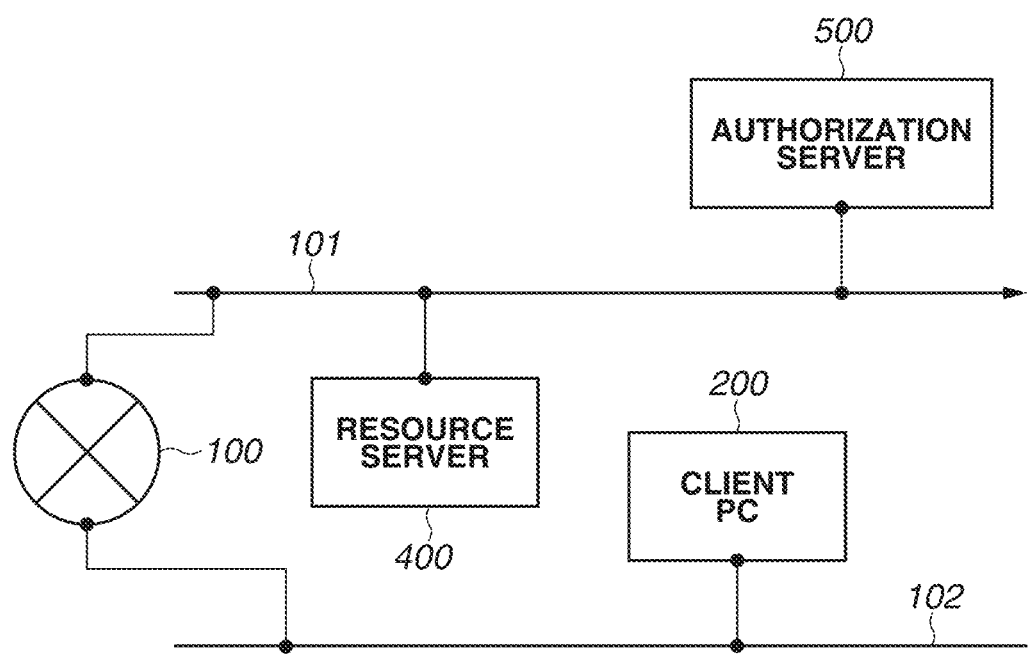
FIG. 8 illustrates a configuration of a system according to a second exemplary embodiment.

An authority transfer system according to the present exemplary embodiment is realized in a network configured as illustrated in FIG. 8. In the present exemplary embodiment, a WWW system is constructed based on the WAN 100. The LANs 101 and 102 connect the respective components to one another.

The authorization server 500 is the server for realizing OAuth, and the authorization service module is set in the authorization server 500. The resource service cooperation application, such as the print service and the form service, is installed in the resource server 400. A single resource server may include a single resource service cooperation application installed therein, or may include a plurality of resource service cooperation applications installed therein. The client PC 200 is operated by the user, and executes the web application 240 on the client PC 200 to use the service such as the print service and the form service with use of the resource in the resource server 400. The present exemplary embodiment is characterized in that the resource server 400 is connected to the same LAN 101 as the authorization server 500. The resource server 400 and the authorization server 500 are connected to each other without being connected via the WAN 100.

Further, the client PC 200 and the resource server 400 are connected to each other via the WAN network 100 and the LANs 101 and 102. The client PC 200 and the respective services may be constructed in respective individual LANs, or may be constructed in a same LAN. Further, they may be constructed on a same PC.

FIG. 2 illustrates the configuration of the client PC 200 according to the present exemplary embodiment. Further, the server computers of the resource server 400 and the authorization server 500 are also configured similarly to the client PC 200. Assume that the hardware block diagram illustrated in FIG. 2 corresponds to the hardware block diagram of the general information processing apparatus, and the hardware configuration of the general information processing apparatus can be employed for the client PC 200 and the server computers according to the present exemplary embodiment. The details of FIG. 2 are similar to those of the first exemplary embodiment.

Figure 9:
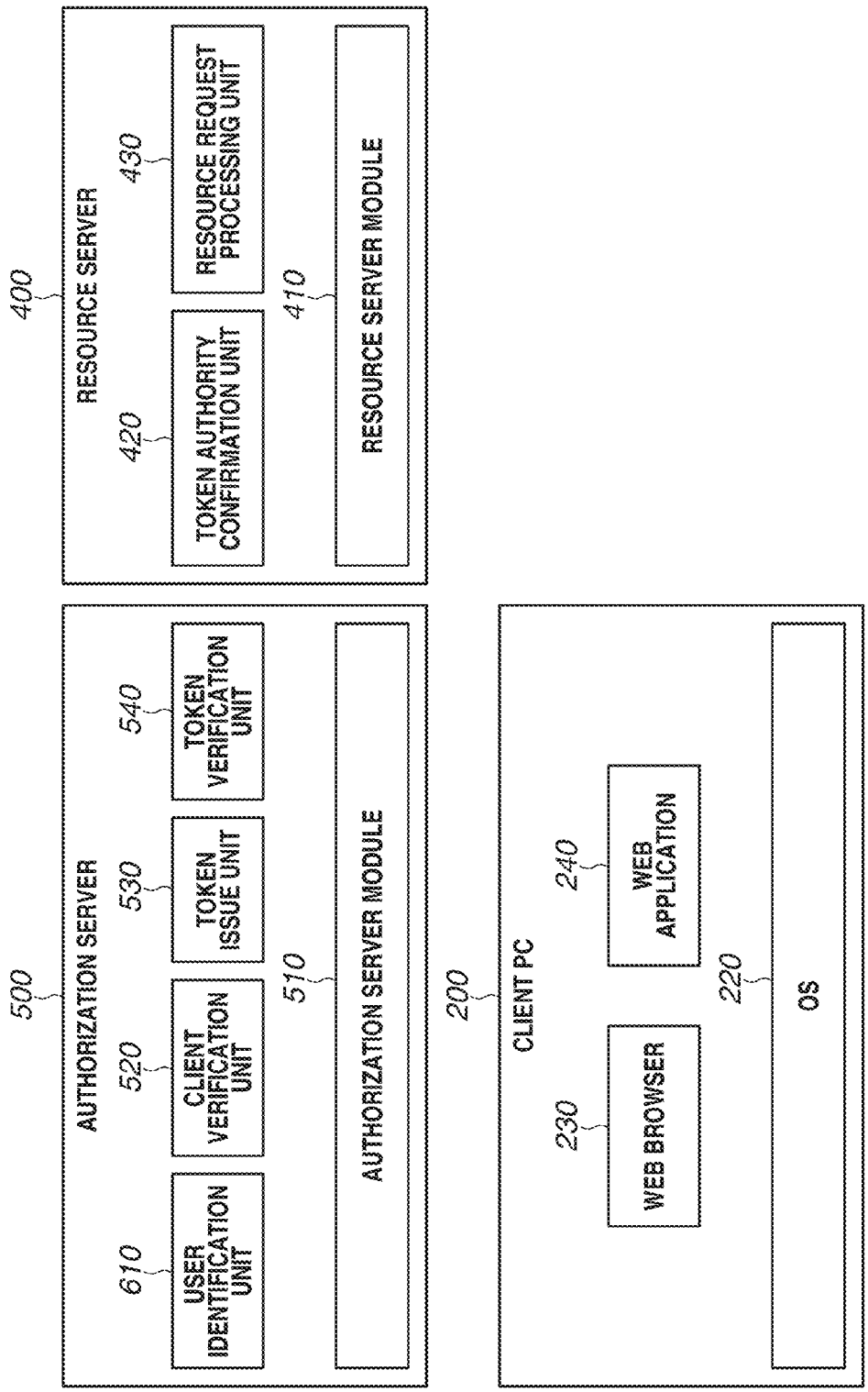
FIG. 9 illustrates a module configuration of each apparatus according to the second exemplary embodiment.

FIG. 9 illustrates a module configuration of each of the authorization server 500, the resource server 400, and the client PC 200 according to the present exemplary embodiment. The authorization server 500, the resource server 400, and the client PC 200 correspond to those illustrated in FIG. 8. The authorization server 500 includes the authorization server module 510. The authorization server module 510 includes the user identification unit 601, the client verification unit 520, the token issue unit 530, and the token verification unit 540. The resource server 400 includes the resource server module 410. The resource server module 410 includes the token authority confirmation unit 420 and the resource request processing unit 430. The CPU 201 executes the OS stored in the ROM 202 or the external memory 203, by which the client PC 200 controls each application. The OS 220 corresponds to this OS, and generally, a real-time OS is used as the OS 220. However, a general-purpose OS such as Linux (registered trademark) may be used in some cases nowadays. Further, the client PC 200 includes the web application 240, which is the user agent for using the WWW. The web application 240 has a function of receiving the redirection URI request for redirecting the access token response from the authorization server 500, and acquiring the access token and requesting the resource, as will be described below.

The Table 1 (user management table), the Table 2 (client management table), and the Table 3 (token management table) described in the first exemplary embodiment are also the data tables that the authorization server 500 stores in the external memory in the second exemplary embodiment. The present exemplary embodiment can be also configured in such a manner that these data tables are stored in another server configured communicably via the LAN 101, instead of being stored in the external memory of the authorization server 500.

Figure 10:
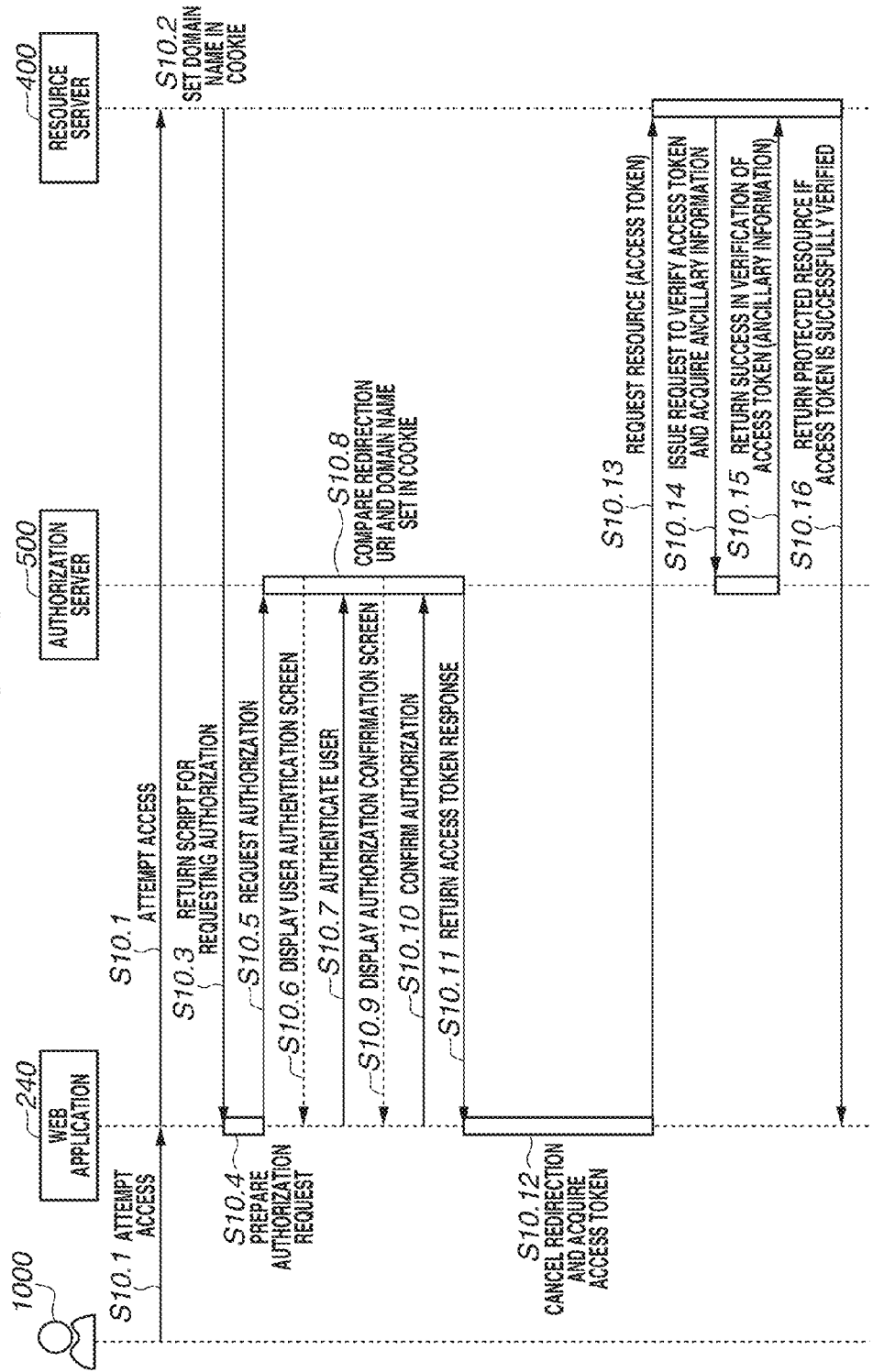
FIG. 10 is a sequence diagram illustrating an authorization flow that allows the authorization confirmation to be omitted according to the second exemplary embodiment.

Now, a sequence of an authorization flow performed when the resource service is used with use of the resource service cooperation application will be described with reference to FIG. 10. According to the specification of OAuth 2.0, the plurality of protocol sequences according to various types of clients is called the grant types. The authorization flow illustrated in FIG. 10 is a grant type developed by adding a unique extension of the present exemplary embodiment to the implicit grant defined in the specification of OAuth 2.0.

First, in step S10.1, the user issues a request to start the authorization cooperation service that requires access to the protected resource. The user as the resource owner 1000 issues this service request to the resource server 400 with use of the HTTP protocol via the web application 240 on the client PC 200 that is the user agent operated by the resource owner 1000. More specifically, in step S10.1, the user as the resource owner 1000 operates the web application 240 on the client PC 200 to access the application screen (not illustrated) of the resource server 400.

This application screen is, for example, the screen for selecting a document to be printed if the resource service cooperation application of the resource server 400 is the print application, or the screen for selecting a form to be created if the resource service cooperation application of the resource server 400 is the form application. The access to the application screen at this time means, for example, that the application screen is selectably displayed on the web application 240 on the client PC 200, and the resource owner 1000 selects this application. In step S10.1, the resource owner 1000 transmits the request to start the authorization cooperation service to the resource server 400 by selecting this application. The present exemplary embodiment is described assuming that the resource service cooperation application exists on the resource server 400. However, generally, the resource service cooperation application may exist on another client application server or the like than the resource server 400. In the present exemplary embodiment, the client application that cooperates with the resource service, such as the print web application and the form web application, is installed as the resource service cooperation application. A single resource server may include a single resource service cooperation application installed therein, or may include a plurality of resource service cooperation applications installed therein.

Next, upon receiving a start of the authorization cooperation according to the request to start the authorization cooperation service (step S10.1), in step S10.2, the resource server 400 sets, in a cookie, the domain that is the domain name of the FQDN of the resource server 400 to the URL of the authentication endpoint of the authorization server 500 that the resource server 400 has, like "domain=example.com". Then, in step S10.3, the resource server 400 issues a redirection request expressed as the HTTP/1.1 status code 302 to the web application 240 on the client PC 200 so that the web application 240 on the client PC 200 requests an OAuth authorization. The ID of the resource server 400, the type of the authentication flow, and the URL of the authentication endpoint of the authorization server 500 are contained in an HTTP Location header of this redirection request. Therefore, the redirection request is configured in the following manner. https://auth.a01.example.com/authorize?response_type=token&client_id=s6BhdRkqt3&state=xyz&redirect_uri=https%3A%2F%2Fclient%2Eexample%2Ecom%2Fcb&scope=scopeA
HTTP method: GET
Content-Type: application/x-www-form-urlencoded The fixed character string "token", the application ID of the client application on the resource server 400 that is preregistered in the authorization server 500 as the client application, and the URL preregistered in the authorization server 500 as the client application are specified as the request parameters "response type", "client_id", and "redirect_uri", respectively. Further, according to OAuth, the redirection request can be also configured in such a manner that the scope indicating the authority range desired to be authorized is contained into an authorization request. In the present exemplary embodiment, the present authorization flow is described assuming that the scope A is requested as the scope.

Next, upon receiving the redirection request, the web application 240 on the client PC 200 stores the respective parameters "response_type", "client_id", "state", "redirect_uri", and "scope" contained in the redirection request. Then, in step S10.5, the web application 240 on the client PC 200 requests the authorization server 500 to authenticate the user and grant an authorization according to the redirection request. In step S10.6, upon receiving the authorization request, the authorization server 500 returns the login screen (not-illustrated) to the web application 240 on the client PC 200 to authenticate the user. In step S10.7, the user as the resource owner 1000 inputs the user ID and the password onto the login screen displayed on the web application 240 on the client PC 200, thereby attempting a login. The authorization server 500 verifies whether the pair of the received user ID and password matches the information registered in the Table 1 (user management table).

Then, the display of the user authentication screen (step S10.6), the user authentication (step S10.7), and the comparison between the redirection URI and the domain parameter included in the cookie (step S10.8), which are subsequent steps, are carried out by similar flows to the flowcharts illustrated in FIGS. 5A and 5B that have been described in the first exemplary embodiment, whereby descriptions thereof will be omitted here. Further, the display of the authorization confirmation screen (step S10.9) and the omission of the authorization confirmation (step S10.10), which are characteristic features of the present exemplary embodiment, and the access token response (step S10.11) are also carried out by similar flows to the flowcharts illustrated in FIGS. 5A and 5B that have been described in the first exemplary embodiment.

The access token response transmitted from the authorization server module 510 to the client PC 200 at this time (step S10.11) is configured according to the specification of OAuth 2.0 in the following manner. More specifically, the authorization server module 510 returns the response to the client PC 200 after adding, for example, the following parameters to a fragment component of the redirection URI with use of the "application/x-www-form-urlencoded" format.

HTTP/1.1 302 Found
Location: http://client.example.com/cb#access_token=AT_000001&state=xyz&token_type=example&expires_in=3600

In this manner, the parameters added to the access token response are "access_token", "token_type", "expires_in", "scope", and "state" according to the specification of OAuth 2.0. As described above, generally, the access token response (step S10.11) returned in the authorization flow according to the implicit grant, like the present exemplary embodiment, is supposed to be first redirected to the redirection URI preregistered in the authorization server 500 to allow the web browser 230 on the client PC 200 to acquire the access token. However, in the present exemplary embodiment, in step S10.12, the web application 240 cancels and rewrites this redirection response, thereby directly acquiring the access token, the scope, and the like for accessing the resource server 400, as will be described below.

Figure 11:
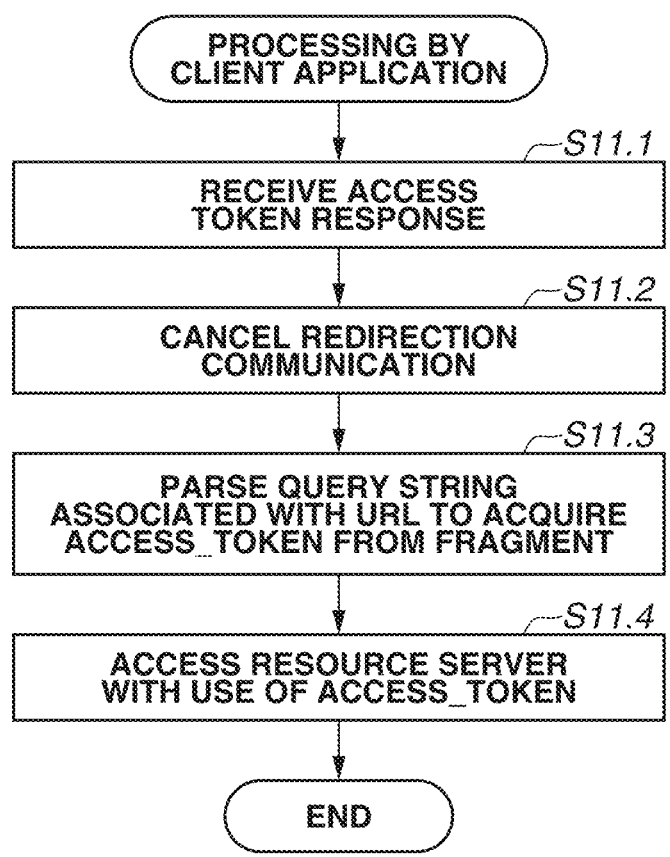
FIG. 11 is a flowchart illustrating processing performed by an application of an authorization client according to the second exemplary embodiment.

FIG. 11 is a flowchart illustrating the operation of the web application 240. In step S11.1, the web application 240 waits for the access token response from the authorization server 500. After the web application 240 receives the access token response (step S10.11) from the authorization server 500 in the step S10.11, in step S11.2, the web application 240 clears "HTTP response 302 Not Found" in the access token response, and sets "HTTP response 200 OK".

At this time, the web application 240 may confirm whether "redirect_uri" contained in the request parameters stored when receiving the response to the access attempt in the step S10.1 matches the redirection destination contained in the Location header of the access token response. Further, in step S11.3, the web application 240 acquires the parameters "access_token", "state", "token_type", and "expires_in" from the URL fragment component of the access token response. Then, in step S11.4, the web application 240 transmits a resource request to the resource server 400 with use of the acquired access token "AT_000001".

In the steps S10.11 and S10.12, the web application 240 receives the access token "AT_000001" according to the flowchart illustrated in FIG. 11. Then, in step S10.13, the web application 240 requests resource access to the resource server 400 while setting the access token "AT_000001", and the scope "resource A" stored in step S10.4 in request parameters.

Upon receiving the access token information "AT_000001" and the scope "resource A", the resource server 400 determines whether to permit or reject the access to the resource for which the request is received based on the acquired information. In the present example, assume that the application ID permitted to access the resource is preset in the resource server 400. Then, the resource server 400 verifies whether to permit the access by comparing this set application ID and an application ID acquired from the access token information "AT_000001". In step S10.14, the resource server 400 carries out this verification by acquiring the token information from the authorization server 500 while setting the access token "AT_000001" and the scope "resource A" as arguments. In step S10.15, the authorization server 500 refers to the Table 3 (token management table) to verify whether the expiration date of the acquired access token "AT_000001" has not yet passed and the requested scope "resource A" is within the scope range. If there is no problem, the authorization server 500 returns a success in the verification. If the resource server 400 determines to permit the access as a result thereof, in step S10.16, the resource server 400 returns the resource to the web application 240. At this time, the resource is, for example, a list of printable documents if the resource server 400 is the print service, or a list of creatable forms if the resource server 400 is the form service.

The present exemplary embodiment has been described assuming that the verification of the token is carried out by each of the authorization server 500 and the resource server 400 in steps S10.14 and S10.15, but can be also configured in such a manner that the authorization server 500 manages the application permitted to access the resource, and carries out all of the verification processes. Further, the present exemplary embodiment has been described assuming that the resource server 400 determines the application permitted to access the resource with use of the application ID, but can be also configured in such a manner that the resource server 400 identifies the web application 240 on the client PC 200 based on the serial number or the client ID that can be acquired from the token information to thereby determine whether to permit or reject the access. Further, similarly, the present exemplary embodiment can be also configured in such a manner that the resource server 400 determines whether to permit or reject the access based on the scope and the user ID that can be acquired from the token information. In step S10.16, upon receiving the resource response, the web application 240 on the client PC 200 constructs the application screen based on the received data, and responds to the user as the resource owner 1000.

The second exemplary embodiment is configured in this manner. A difference from the processing according to the first exemplary embodiment is that the web application 240, which is the client, acquires the authority information without accessing the web-hosted client 300 that would be the endpoint for allowing the client to acquire the authority information. The client application capable of performing a special operation can realize the second exemplary embodiment, unlike the web browser having its operational range limited to general operations. The second exemplary embodiment has a merit of eliminating the necessity of taking one more step of accessing the web-hosted client 300.

A third exemplary embodiment will be described as a configuration that encrypts the access token while the authorization confirmation screen is skipped in a case where the redirection URI belongs to the same domain. The third exemplary embodiment corresponds to an example that encrypts the access token described in the first exemplary embodiment. According to the implicit grant defined in OAuth 2.0, the access token issued by the authorization server 500 is directly provided to the client PC 200, which may raises a problem of the token being stolen by fraud or the like. The first exemplary embodiment is characterized in the omission of requesting the user 1000 to explicitly confirm the authorization for the reason that the web-hosted client 300, which is the destination of the access token response, belongs to the same security domain as the authorization server 500. The present exemplary embodiment adds the encryption of the access token to the first exemplary embodiment, thereby realizing more secure access to the resource server 400. Since the present exemplary embodiment is an exemplary embodiment constructed by adding the encryption of the token to the first exemplary embodiment, descriptions of similar components and flows to the first exemplary embodiment will be omitted below.

An authority transfer system according to the present exemplary embodiment is realized in the network configured as illustrated in FIG. 1, in a similar manner to the first exemplary embodiment. The client PC 200 according to the present exemplary embodiment is configured as illustrated in FIG. 2, in a similar manner to the first exemplary embodiment. Further, the server computers of the web-hosted client 300, the resource server 400, and the authorization server 500 are also configured similarly to the client PC 200. Assume that the hardware block diagram illustrated in FIG. 2 corresponds to the hardware block diagram of the general information processing apparatus, and the hardware configuration of the general information processing apparatus can be employed for the client PC 200 and the server computers according to the present exemplary embodiment.

FIG. 19 illustrates a module configuration of each of the authorization server 500, the resource server 400, the client PC 200, and the web-hosted client 300 according to the present exemplary embodiment. The authorization server 500, the resource server 400, the client PC 200, and the web-hosted client 300 are similar to those illustrated in FIG. 3 according to the first exemplary embodiment, whereby descriptions thereof will be omitted here. The authorization server 500 also includes the authorization server module 510 in a similar manner to FIG. 3. The authorization server module 510 includes the user identification unit 610, the client verification unit 520, the token issue unit 530, and the token verification unit 540. In addition thereto, the authorization server module 510 includes an encryption processing unit 550 as a characteristic feature of the present exemplary embodiment.

The authorization server 500 according to the present exemplary embodiment has the Table 1 (user management table), the Table 2 (client management table), and the Table 3 (token management table), which are the data tables stored in the external memory. The present exemplary embodiment can be also configured in such a manner that these data tables are stored in another server configured communicably via the LAN 101, instead of being stored in the external memory of the authorization server 500. These tables are similar to Table 1, Table 2, and Table 3 in the first exemplary embodiment, whereby descriptions thereof will be omitted here.

Figure 12:
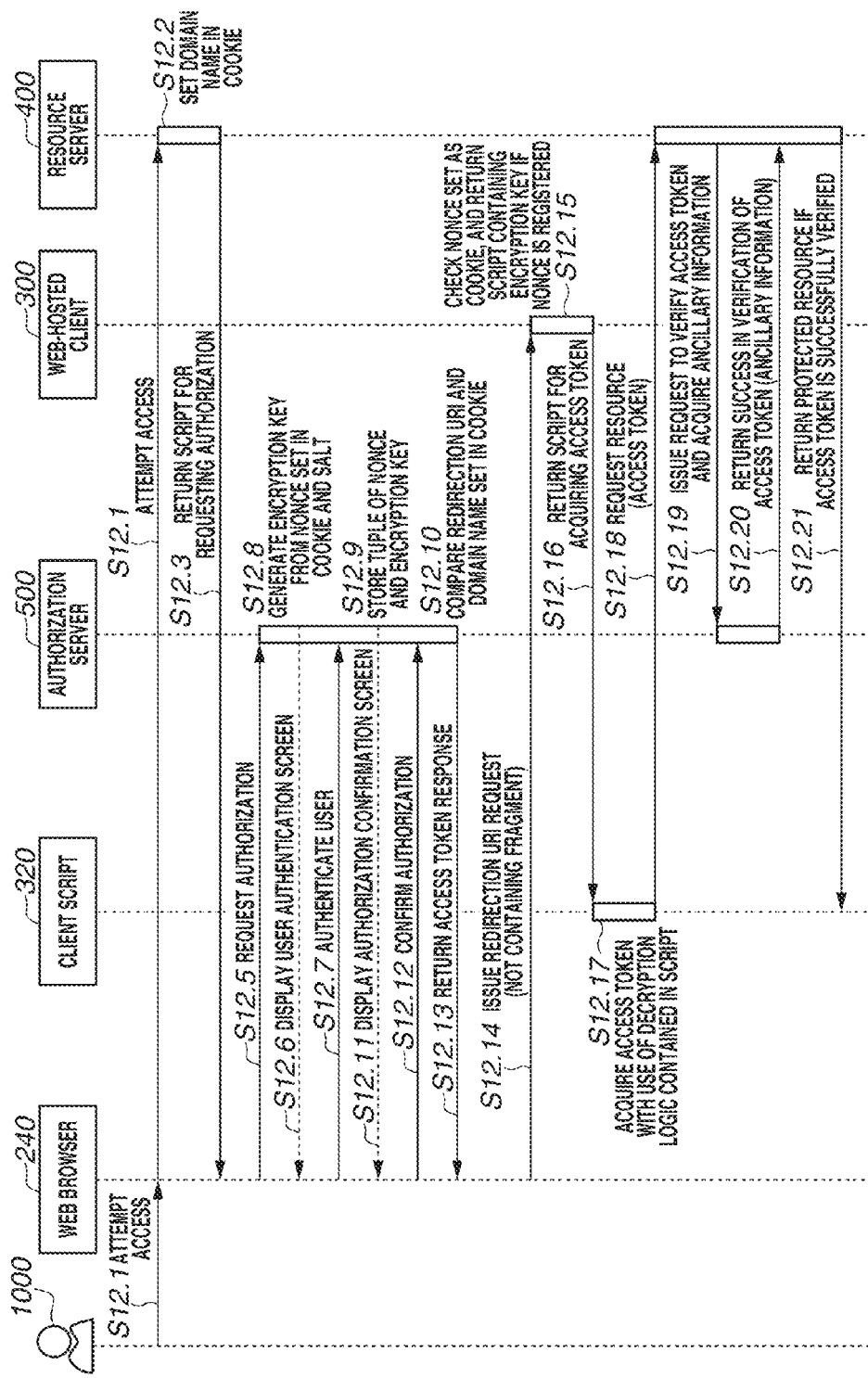
FIG. 12 is a sequence diagram illustrating an authorization flow that allows the authorization confirmation to be omitted according to a third exemplary embodiment.

Now, a sequence indicating an authorization flow according to the present exemplary embodiment for using the resource service with use of the browser application on the client PC 200 will be described with reference to FIG. 12. According to the specification of OAuth 2.0, the plurality of protocol sequences according to various types of clients is called the grant types. The authorization flow illustrated in FIG. 12 is a grant type developed by adding a unique extension of the present exemplary embodiment to the implicit grant defined in the specification of OAuth 2.0.

First, in step S12.1, the user issues a request to start the authorization cooperation service that requires access to the protected resource. The user as the resource owner 1000 issues this service request to the resource server 400 with use of the HTTP protocol via the browser application on the client PC 200 that is the user agent operated by the resource owner 1000. More specifically, in step S12.1, the user as the resource owner 1000 operates the client PC 200 to access the application screen (not illustrated) of the resource server 400. This application screen is, for example, the screen for selecting a document to be printed if the resource service cooperation application of the resource server 400 is the print application. On the other hand, the application screen is, for example, the screen for selecting a form to be created if the resource service cooperation application of the resource server 400 is the form application.

The access to the application screen at this time means, for example, that the application screen is selectably displayed on the browser on the client PC 200, and the resource owner 1000 selects this application. In step S12.1, the resource owner 1000 transmits the request to start the authorization cooperation service to the resource server 400 by selecting this application. The present exemplary embodiment is described assuming that the resource service cooperation application exists on the resource server 400. However, generally, the resource service cooperation application may exist on another client application server or the like than the resource server 400. In the present exemplary embodiment, the client application that cooperates with the resource service, such as the print web application and the form web application, is installed as the resource service cooperation application. A single resource server may include a single resource service cooperation application installed therein, or may include a plurality of resource service cooperation applications installed therein.

Next, upon receiving a start of the authorization cooperation according to the request to start the authorization cooperation service (step S12.1), in step S12.2, the resource server 400 sets, in a cookie, the domain that is the domain name of the FQDN of the resource server 400 to the URL of the authentication endpoint of the authorization server 500 that the resource server 400 has, like "domain=example.com". Further, the resource server 400 sets a nonce value expressed as a unique ID indicated by a hexadecimal character string, like a Universally Unique Identifier (UUID), based on a random number in the cookie in a similar manner to the domain, like "nonce=ed670784-2aea-4a32-88d6-6e49c5dd9e6b". Then, in step S12.3, the resource server 400 issues a redirection request expressed as the HTTP/1.1 status code 302 to the browser on the client PC 200 so that the browser on the client PC 200 requests an OAuth authorization. The ID of the resource server 400, the type of the authentication flow, and the URL of the authentication endpoint of the authorization server 500 are contained in an HTTP Location header of this redirection request. Therefore, the redirection request is configured in the following manner. https://auth.a01.example.com/authorize?response_type=token&client_id=s6BhdRkqt3&state=xyz&redirect_uri=https%3A%2F%2Fclient%2Eexample%2Ecom%2Fcb-&scope=scopeA
HTTP method: GET
Content-Type: application/x-www-form-urlencoded The fixed character string "token", the application ID of the client application on the resource server 400 that is preregistered with the authorization server 500 as the client application, and the URL of the web-hosted client 300 preregistered with the authorization server 500 as the client application are specified as the request parameters "response type", "client_id", and "redirect_uri", respectively. Further, according to OAuth, the redirection request can be also configured in such a manner that the scope indicating the authority range desired to be authorized is contained into an authorization request. In the present exemplary embodiment, the present authorization flow is described assuming that the scope A is requested as the scope.

Next, in step S12.5, upon receiving the redirection request, the client PC 200 requests the authorization server 500 to authenticate the user and grant an authorization according to the redirection request. In step S12.6, upon receiving the authorization request, the authorization server 500 returns the login screen 2000 illustrated in FIG. 6A to the browser on the client PC 200 to authenticate the user. In step S12.7, the user as the resource owner 1000 inputs the user ID and the password onto the login screen displayed on the browser on the client PC 200, thereby attempting a login. The authorization server 500 verifies whether the pair of the received user ID and password matches the information registered in the Table 1 (user management table). Now, the display of the user authentication screen (step S12.6), the user authentication (step S12.7), generation of an encryption key (S12.8), storage of a pair of the nonce and the encryption key (S12.9), and the comparison between the redirection URI and the domain parameter included in the cookie (step S12.10) will be described with reference to flowcharts illustrated in FIGS. 13A and 13B, which will be described below. Further, the display of the authorization confirmation screen (step S12.11) and the omission of the authorization confirmation (step S12.12), which are characteristic features of the present exemplary embodiment, and the access token response (step S12.13) will be described.

Figure 13A:
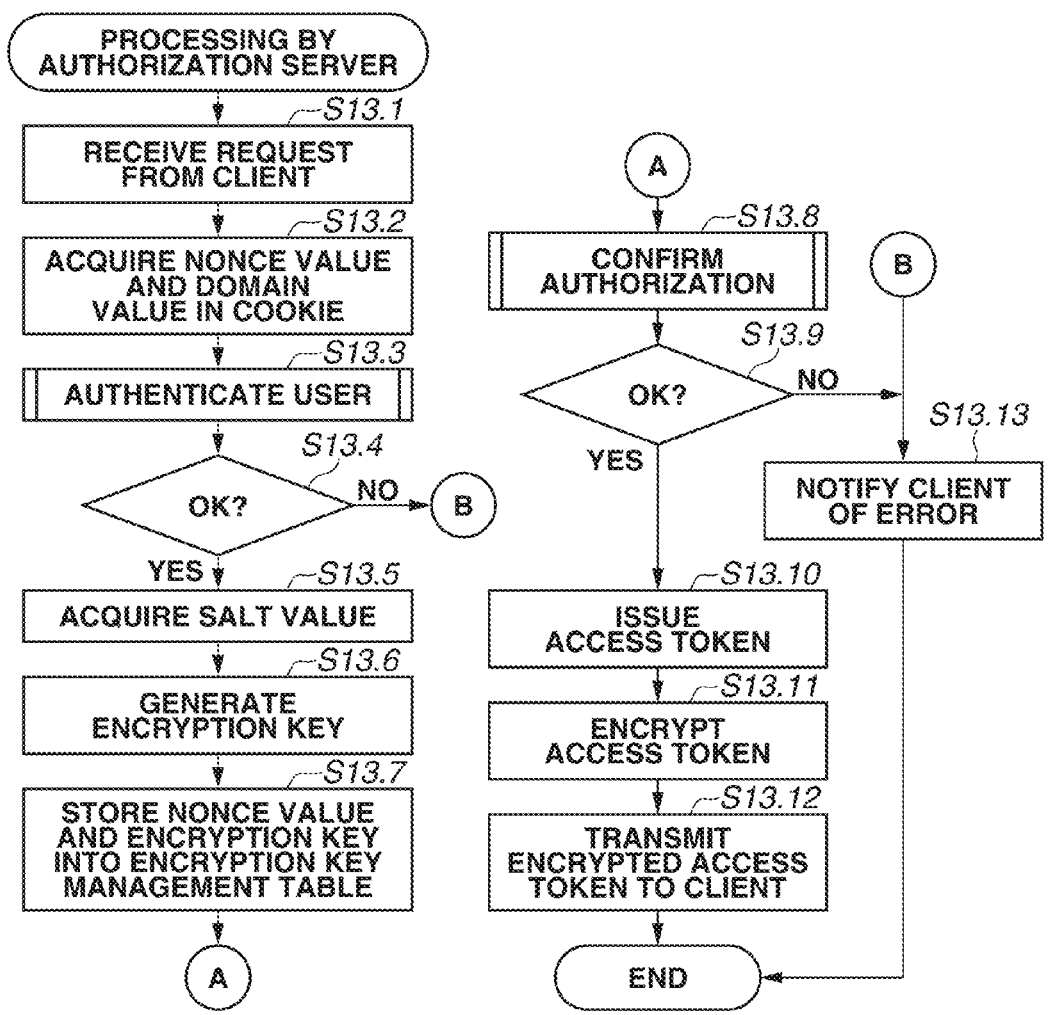
FIGS. 13A and 13B are flowcharts illustrating processing performed by an authorization server according to the third exemplary embodiment.
Figure 13B:
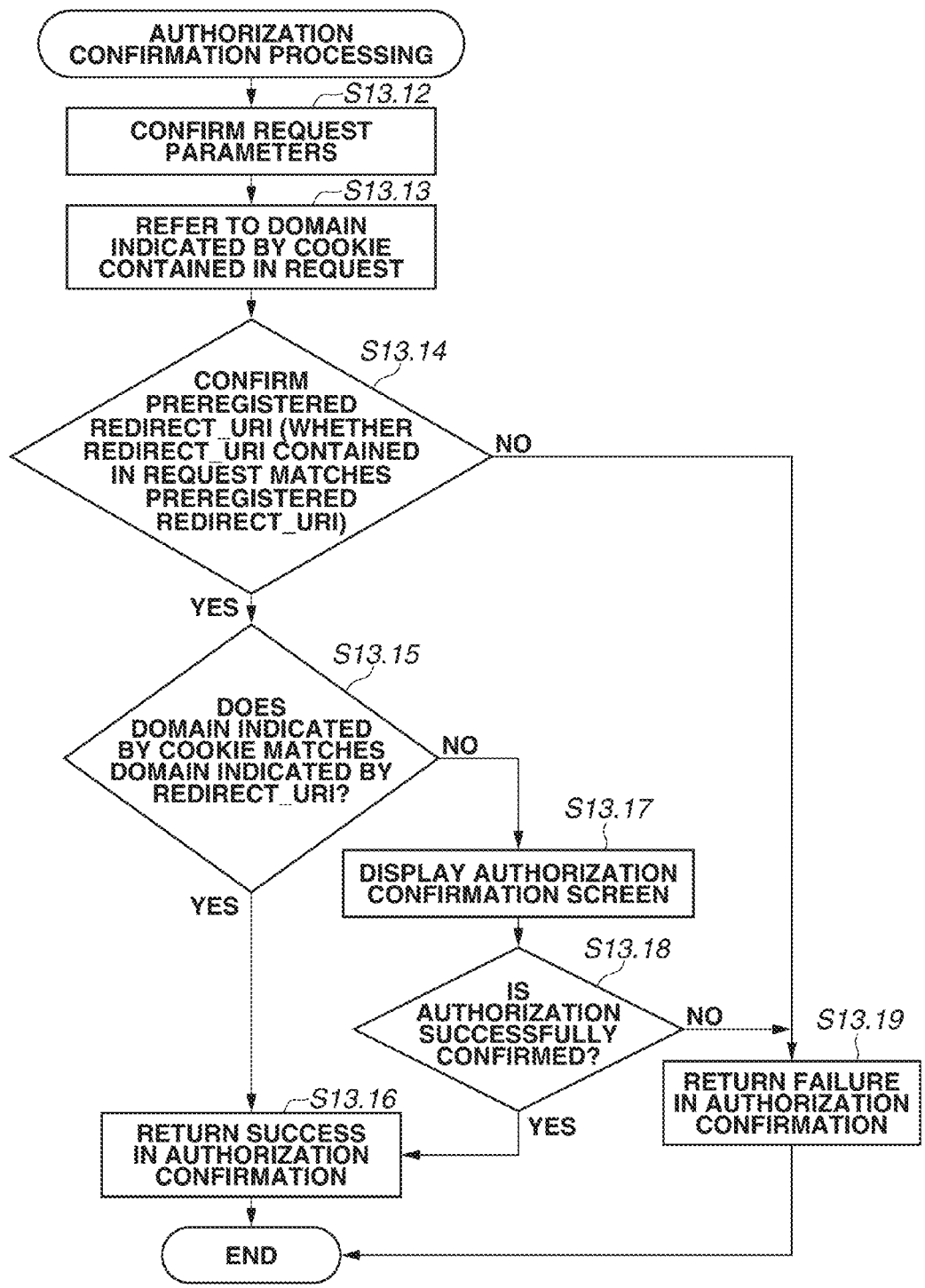

FIGS. 13A and 13B are flowcharts illustrating processing performed by the authorization server module 510 on the authorization server 500 when the authorization server 500 receives the request to authenticate the user and grant an authorization. In step S13.1, the authorization server module 510 receives the redirection request from the client PC 200, which triggers a start of the present flowchart. The authorization server module 510 returns the login screen 2000 illustrated in FIG. 6A to the browser on the client PC 200 to authenticate the user. In step S12.7, the user as the resource owner 1000 inputs the user ID and the password onto the login screen 2000 displayed on the browser on the client PC 200, thereby attempting a login. In step S13.2, the authorization server 500 acquires the nonce value and the domain name from the cookie contained in the redirection request received from the client PC 200.

Further, in step S13.3, the authorization server 500 verifies whether the pair of the received user ID and password matches the information registered in the Table 1 (user management table). If the pair of the user ID and the password is not registered in the Table 1 (user management table) as a result of the verification (NO in step S13.4), in step S13.13, the authorization server 500 notifies the client PC 200 of the user authentication error screen (not illustrated), and then ends the processing. If the pair of the user ID and the password is registered in the Table 1 (user management table) as a result of the verification (YES in step S13.4), next, in steps S13.5, S13.6, and S13.7, the authorization server 500 performs encryption key generation processing.

In step S13.5, first, the authorization server module 510 acquires a salt for use in the generation of the encryption key. In the present exemplary embodiment, assume that the salt is an 8-byte character string "abcdefgh" pre-stored in the authorization server module 510. The authorization server module 510 uses this salt to generate a more disarranged key. More specifically, the authorization server module 510 adds the 8-byte data (the salt) to the nonce value in advance before acquiring a digest value of the nonce value previously acquired in step S13.2, which is used as an origin of the encryption key, and then acquires the digest value. The length of the salt does not necessarily have to be fixed, and may be any length around 8 bytes.

Next, in step S13.6, the authorization server module 510 combines the salt acquired in the step S13.5 and the nonce value acquired in the step S13.2, and calculates a hash value according to the Secure Hash Algorism (SHA)-256 hash algorithm, thereby generating the encryption key. In the present exemplary embodiment, the authorization server module 510 generates "29674fead5e38ad1b9f37b2be-28358b15c8fd35310d29eb7e5594e9a5f30d7e0" as the encryption key by hashing "abcdefghed6707842aea4a32-88d6-6e49c5dd9e6b", which is a character string generated by adding the salt to the beginning of the nonce, according to the SHA-256 algorithm. Then, in step S13.7, the authorization server module 510 stores the nonce value and the generated encryption key into a Table 4 (nonce-encryption key management table), as will be described below. Further, in the present exemplary embodiment, the authorization server module 510 uses the Advanced Encryption Standard (AES) (256-bit) Cipher Block Chaining (CBC) mode as the encryption algorithm, which necessitates an initialization vector (iv) required for the CBC mode. The authorization server module 510 randomly generates the iv at the same time as the generation of the encryption key. In the present exemplary embodiment, in step S13.7, the authorization server module 510 generates "3729A7F036235FBA26C138D4BB556172" as the iv.

The following table, Table 4 is a data table that the authorization server 500 stores in the external memory. The present exemplary embodiment can be also configured in such a manner that this data table is stored in another server configured communicably via the LAN 101, instead of being stored in the external memory of the authorization server 500. The present exemplary embodiment is configured in such a manner that the authorization server 500 can generate, refer to, update, and delete Table 4 while the web-hosted client 300 can refer to Table 4, as the authorization server 500 and the web-hosted client 300 are connected to the same LAN 101.

TABLE 4

NONCE-ENCRYPTION KEY MANAGEMENT TABLE

| NONCE | ENCRYPTION KEY | IV |
|---|---|---|
| ed670784-2aea-4a32-88d6-6e49c5dd9e6b | 29674fead5e38ad1b9f37b2be28358b15c8fd35310d29eb7e5594e9a5f30d7e0 | 3729A7F036235FBA26C138D4BB556172 |

Table 4 is the nonce-encryption key management table. This table includes the nonce value, the encryption key, and the iv. FIG. 13B is a flowchart illustrating authorization confirmation processing performed by the authorization server module 510 on the authorization server 500 according to the present exemplary embodiment. In the present authorization confirmation processing, in step S13.12, the authorization server module 510 confirms the request parameters contained in the redirection request received from the client PC 200 in step S13.1. Further, in step S13.13, the authorization server module 510 acquires the domain parameter included in the cookie contained in the request, for example, "domain=example.com". At this time, in step S13.14, the authorization server module 510 refers to the Table 2 (client management table) to confirm whether the values of the request parameters "client_id" and "redirect_uri" contained in the redirection request are registered in the Table 2 (client management table).

If the values of the request parameters "client_id" and "redirect_uri" contained in the redirection request are not registered in the Table 2 (client management table) at this time (NO in step S13.14), in step S13.19, the authorization server module 510 returns a failure in the authorization confirmation, and then ends the processing. If the values of the request parameters "client_id" and "redirect_uri" contained in the redirection request are registered in the Table 2 (client management table) (YES in step S13.14), next, in step S13.15, the authorization server module 510 refers to the domain parameter included in the cookie acquired in step S13.13, and compares this domain parameter with the domain indicated by the request parameter "redirect_uri" to determine whether they match each other. In the present exemplary embodiment, the domain parameter included in the cookie is "domain=example.com", whereby "example.com" is acquired as the domain. Further, the request parameter "redirect_uri" is converted into "redirect_uri=https://client.example.com/cb" by URL decoding, whereby "example.com" is acquired as the domain. Therefore, in step S13.16, the authorization server module 510 returns a success in the authorization confirmation without returning the authorization confirmation screen to the client PC 200.

If the domain indicated by the domain parameter included in the cookie and the domain indicated by the request parameter "redirect_uri" are different from each other at this time (NO in step S13.15), in step S13.17, the authorization server module 510 returns the authorization confirmation screen illustrated in FIG. 6B to the client PC 200. Then, the authorization server module 510 waits for a response from the client PC 200. If the authorization confirmation has failed (NO in step S13.18), in step S13.19, the authorization server module 510 returns a failure in the authorization confirmation, and then ends the processing. On the other hand, if the authorization confirmation has succeeded (YES in step S13.18), in step S13.16, the authorization server module 510 returns a success in the authorization confirmation, and then ends the processing.

Referring back to FIG. 13A, if the authorization confirmation has failed (NO in step S13.9) after the end of the authorization confirmation processing illustrated in FIG. 13B (step S13.8), in step S13.13, the authorization server module 510 notifies the client PC 200 of the user authorization error screen (not illustrated), and then ends the processing. If the authorization confirmation processing (step S13.8) has succeeded (YES in step S13.9), in step S13.10, the authorization server module 510 performs access token issue processing for generating the access token that allows access to the resource server 400.

The authorization server module 510 encrypts the generated access token with use of the encryption key generated in the step S13.6 to generate an encrypted token character string, and registers the encrypted token character string into the Table 3 (token management table). More specifically, the authorization server module 510 encrypts the access token character string "AT_000001" with use of the encryption key "29674fead5e38ad1b9f37b2be-28358b15c8fd35310d29eb7e5594e9a5f30d7e0" and the iv "3729A7F036235FBA26C138D4BB556172", and further converts the encrypted access token into a character string "mPfaCXa3vOxJW5R9cuBqmQ==" according to the BASE64 encoding method. Then, the authorization server module 510 stores this generated encrypted token character string "mPfaCXa3vOxJW5R9cuBqmQ==" into the token ID in Table 3 as the token ID.

Further, the authorization server module 510 stores the expiration date of the access token predetermined by the authorization server 500 into the expiration date. Further, the authorization server module 510 stores scope information and the user ID contained in a record of an authentication token already registered in the token table into the scope and the user ID, respectively. In this manner, in step S13.12, the authorization server 500 issues the encrypted access token "mPfaCXa3vOxJW5R9cuBqmQ==" that allows resource access to the resource server 400 without requesting the user to explicitly confirm the authorization. This is because the web-hosted client 300, the resource server 400, and the authorization server 500 are connected to one another without being connected via the WAN 100. In the present exemplary embodiment, the LAN 101 is considered to be inside the premises, and the web-hosted client 300, the resource server 400, and the authorization server 500 are considered to belong to the same security domain.

The access token response transmitted from the authorization server module 510 to the client PC 200 at this time (step S12.13) is configured according to the specification of OAuth 2.0 in the following manner. More specifically, the authorization server module 510 returns the response to the client PC 200 after adding, for example, the following parameters to the fragment component of the redirection URI with use of the "application/x-www-form-urlencoded" format.
HTTP/1.1 302 Found
Location:
http://client.example.com/
   cb#access_token=mPfaCXa3vOxJW5R9c
   uBqmQ&state=xyz&token_type=example&expires_
   in=3600

In this manner, the parameters added to the access token response are "access_token", "token_type", "expires_in", "scope", and "state" according to the specification of OAuth 2.0. Further, the access token response (step S12.13) contains the nonce value in a cookie. The nonce value registered in the Table 4 is set as this nonce value.

As described above, the access token response (step S12.13) returned in the authorization flow according to the implicit grant, like the present exemplary embodiment, is set so as to be first redirected to the web-hosted client 300 to allow the web browser 230 on the client PC 200 to acquire the access token.

In step S12.14, upon receiving the access token response, the web browser 230 on the client PC 200 redirects this access token response to the web-hosted client 300. At this time, the redirection in step S12.14 does not contain the parameters of the fragment component according to the HTTP specification.

In step S12.15, upon receiving the redirection, the web-hosted client module 310 of the web-hosted client 300 acquires the nonce value from the cookie contained in the redirection HTTP communication to confirm the nonce value. Then, if the nonce value is contained therein, in step S12.16, the web-hosted client module 310 of the web-hosted client 300 returns a response containing a script that allows the web browser 230 on the client PC 200 to acquire the encrypted access token. Generally, this script is JavaScript (registered trademark) executable on the web browser 230, but may be another script executable on the browser. Further, the web-hosted client 300 returns a cookie containing the encryption key for decrypting the encrypted access token to be acquired by the web browser 230.

FIG. 14 is a flowchart illustrating processing performed by the web-hosted client module 310 in the steps from steps S12.14 to S12.16. In step S14.1, the web-hosted client module 310 receives the redirection response from the web browser 230. Further, in step S14.2, the web-hosted client module 310 acquires the nonce value from the cookie parameter contained in the redirection HTTP communication. This nonce value is the value set in step S12.13. At this time, in step S14.3, the web-hosted client module 310 refers to the Table 4 (nonce-encryption key management table) to confirm whether this acquired nonce value is registered therein.

If the nonce value is not registered in Table 4 (NO in step S14.3), the web-hosted client module 310 generates an error screen (not illustrated) to transmit the generated error screen to the web browser 230, and then ends the processing. If the nonce value is registered in Table 4 (YES in step S14.3), in step S14.4, the web-hosted client module 310 acquires the encryption key and the iv corresponding to the matching nonce. Then, in step S14.5, the web-hosted client module 310 sets the encryption key and the iv in the cookie, like "key=29674fead5e38ad1b9f37b2be28358b15c8fd-35310d29eb7e5594e9a5f30d7e0, and iv=3729A7F036235FBA26C138D4BB556172". Then, in step S14.6, the web-hosted client module 310 acquires the script for acquiring and decrypting the access token, which will be described below. In step S14.7, the web-hosted client module 310 returns the acquired script to the web browser 230, and then ends the processing.

In this manner, the web-hosted client module 310 confirms the nonce value, which can prevent the web-hosted client module 310 from returning the encryption key regarding the decryption of the token and the script for acquiring the access token to a browser or the like unrelated to the series of processes. As a result, even if the unrelated browser or the like as described above steals the encrypted access token by fraud, the access to the web-hosted client 300 results in an error, which can prohibit the unrelated browser from decrypting the encrypted access token stolen by fraud, thereby preventing unauthorized access to the resource server 400.

In step S12.17, upon receiving the script for acquiring and decrypting the access token, the web browser 230 acquires the encryption key from the cookie. Then, the web browser 230 decrypts and acquires the access token by executing the script for acquiring and decrypting the access token. Then, in step S12.18, the script can access the resource server 400 with use of the decrypted access token.

Figure 15:
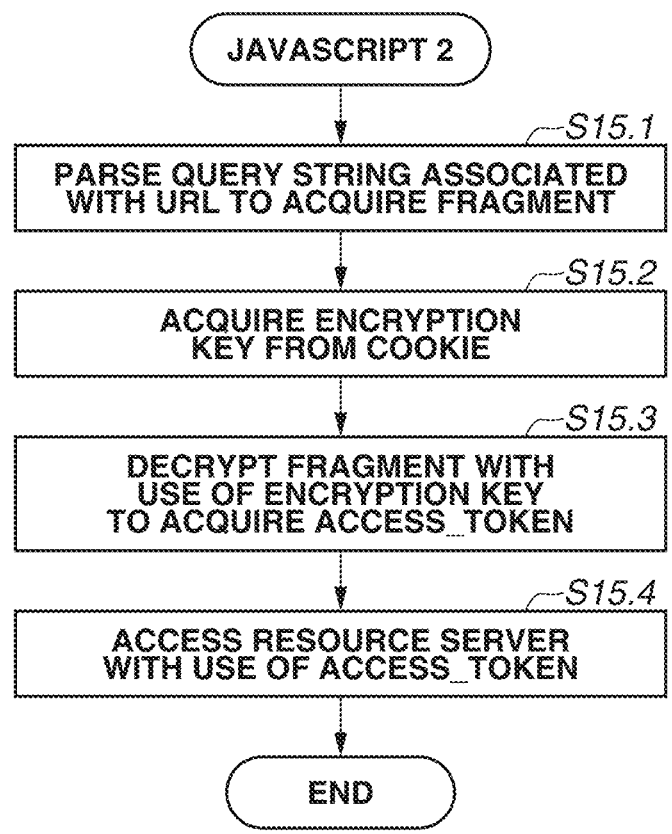
FIG. 15 is a flowchart illustrating processing performed by a script on an authorization client according to the third exemplary embodiment.

FIG. 15 is a flowchart illustrating the script for acquiring the access token to access the resource server 400. Upon receiving the script from the web-hosted client 300, the web browser 230 on the client PC 200 executes this flowchart. First, in step S15.1, the web browser 230 parses a query string associated with the URI that is the redirection destination of the access token response (step S12.13) to acquire the value of the fragment. For example, according to JavaScript (registered trademark) in the present exemplary embodiment, the web browser 230 acquires the value of the fragment component in the access token response redirected to the web-hosted client 300 with use of the location.hash function.

Further, in step S15.2, the web browser 230 acquires the encrypted access token "access_token=mPfaCXa3vOxJW5R9cuBqmQ" contained in the acquired fragment component. Further, the web browser 230 acquires the encryption key "key=29674fead5e38ad1b9f37b2be28358b15c8fd35310d29-eb7e5594e9a5f30d7e0" and the initialization vector "iv=3729A7F036235FBA26C138D4BB556172" from the cookie parameter contained in the HTTP communication transmitted in the return of the script for acquiring the access token in step S12.16. At this time, in step S15.3, the web browser 230 decrypts the previously acquired encrypted access token with use of these encryption key and initialization vector to acquire the access token. Then, in step S15.4, the web browser 230 accesses the resource server 400 with use of the acquired access token by executing the present script.

In step S15.3, and steps S15.1 and S15.2, the script running on the web browser 230 receives the access token "AT_000001" and the scope "resource A", respectively, through the flowchart illustrated in FIG. 15. Then, in step S12.18, the script requests resource access to the resource server 400 while setting the access token "AT_000001" and the scope "resource A" in request parameters.

Upon receiving the access token information "AT_000001" and the scope "resource A", the resource server 400 determines whether to permit or reject the access to the resource for which the request is received based on the acquired information. In the present example, assume that the application ID permitted to access the resource is preset in the resource server 400, and the resource server 400 verifies whether to permit the access by comparing the set application ID and the application ID acquired from the access token information "AT_000001". In step S12.19, the resource server 400 carries out this verification by acquiring token information from the authorization server 500 while setting the access token "AT_000001" and the scope "resource A" as arguments.

In step S12.20, the authorization server 500 refers to the Table 3 (token management table) to verify whether the expiration date of the acquired access token "AT_000001" has not yet passed and the requested scope "resource A" is within the scope range. Then, if there is no problem, the authorization server 500 returns a success in the verification. If the resource server 400 determines to permit the access as a result thereof, in step S12.21, the resource server 400 returns the resource to the web browser 230. At this time, the resource is, for example, a list of printable documents if the resource server 400 is the print service, or a list of creatable forms if the resource server 400 is the form service.

The present exemplary embodiment has been described assuming that the verification of the token is carried out by each of the authorization server 500 and the resource server 400 in steps S12.19 and S12.20, but can be also configured in such a manner that the authorization server 500 manages the application permitted to access the resource, and carries out all of the verification processes. Further, the present exemplary embodiment has been described assuming that the resource server 400 determines the application permitted to access the resource with use of the application ID, but can be also configured in such a manner that the resource server 400 identifies the web browser 230 on the client PC 200 based on the serial number or the client ID that can be acquired from the token information to thereby determine whether to permit or reject the access. Further, similarly, the present exemplary embodiment can be also configured in such a manner that the resource server 400 determines whether to permit or reject the access based on the scope and the user ID that can be identified from the token information.

In step S12.21, upon receiving the resource response, the web browser 230 on the client PC 200 constructs the application screen based on the received data, and responds to the user as the resource owner 1000. The third exemplary embodiment can be also applied to the configuration according to the second exemplary embodiment. In this case, in step S10.12, the web application 230 acquires the script for decrypting the encrypted authority information without cancelling the redirection.

According to the third exemplary embodiment, the access token is transmitted to the client in an encrypted state, which can maintain security even when the access token is acquired and exploited by the client before completion of the series of authorization processes.

A fourth exemplary embodiment will be described as processing for determining whether to skip or not the encryption of the access token and the authorization confirmation screen based on the scope, in the configuration featuring the skip of the authorization confirmation screen in the case where the redirection URI belongs to the same domain. The present exemplary embodiment is an example in which the authorization server 500 determines whether to omit or not the authorization confirmation screen and whether to encrypt or not the access token, which are carried out in the third exemplary embodiment.

The third exemplary embodiment has been described in detail as the method for omitting the authorization confirmation screen in consideration of the convenience for the user belonging to the same security domain. However, some risk may be imposed on the user from access to a target scope depending on the scope defined by the authorization server 500. Examples of such a scope include a scope that leads to disclosure of a document to a third party, a scope that leads to charging high payment, and a scope that leads to prohibition of use of a part of the service. In this case, the scope can be set in such a manner that the authorization confirmation screen is forced to be displayed, like the present exemplary embodiment.

Further, the third exemplary embodiment has been described in detail as the method for encrypting the access token in consideration of the security of the access token in the implicit grant defined in OAuth 2.0. However, the performance may be prioritized over the protection with respect to access to a target scope depending on the scope defined by the authorization server 500. Examples of such a scope include a scope usable by users with no charge and expected to receive access from such a large number of client PCs 200 to affect the processing performance of the authorization server 500. In this case, the scope can be set in such a manner that the access token is not encrypted, like the present exemplary embodiment.

In the following description, a method for controlling whether to omit or not the authorization confirmation screen and whether to encrypt or not the access token as described above based on determination of a scope type by the authorization server 500 will be described in detail. The present exemplary embodiment is basically an exemplary embodiment constructed by adding processing for determining the authorization confirmation and the encryption based on the scope type to the first and third exemplary embodiments, whereby descriptions of similar components and flows to the first and third exemplary embodiments will be omitted below.

An authority transfer system according to the present exemplary embodiment is realized in the network configured as illustrated in FIG. 1, in a similar manner to the first exemplary embodiment. The client PC 200 according to the present exemplary embodiment is configured as illustrated in FIG. 2, in a similar manner to the first exemplary embodiment. Further, the server computers of the web-hosted client 300, the resource server 400, and the authorization server 500 are also configured similarly to the client PC 200. Assume that the hardware block diagram illustrated in FIG. 2 corresponds to the hardware block diagram of the general information processing apparatus, and the hardware configuration of the general information processing apparatus can be employed for the client PC 200 and the server computers according to the present exemplary embodiment.

FIG. 17 illustrates a module configuration of each of the authorization server 500, the resource server 400, the client PC 200, and the web-hosted client 300 according to the present exemplary embodiment. The authorization server 500, the resource server 400, the client PC 200, and the web-hosted client 300 are similar to those illustrated in FIG. 3 according to the first exemplary embodiment, whereby descriptions thereof will be omitted here. The authorization server 500 also includes the authorization server module 510 in a similar manner to FIG. 3. The authorization server module 510 includes the user identification unit 610, the client verification unit 520, the token issue unit 530, the token verification unit 540, and the encryption processing unit 550. In addition thereto, the authorization server module 510 includes a token determination processing unit 560 as a characteristic feature of the present exemplary embodiment.

The authorization server 500 according to the present exemplary embodiment has the Table 1 (user management table), the Table 2 (client management table), the Table 3

(token management table), and the Table 4 (nonce-encryption key management table), which are the data tables stored in the external memory. The present exemplary embodiment can be also configured in such a manner that these data tables are stored in another server configured communicably via the LAN 101, instead of being stored in the external memory of the authorization server 500. These tables are similar to Table 1, Table 2, Table 3, and Table 4 in the first and third exemplary embodiments, whereby descriptions thereof will be omitted here.

Now, a sequence indicating an authorization flow according to the present exemplary embodiment for using the resource service with use of the browser application on the client PC 200 is similar to the sequence illustrated in FIG. 12 according to the third exemplary embodiment. The present exemplary embodiment is different from the third exemplary embodiment in terms of the processing performed by the authorization server 500 illustrated in FIGS. 13A and 13B and the processing performed by the web-hosted client 300 illustrated in FIG. 14, which have been described in the sequence illustrated in FIG. 12. In the following description, processing performed by the authorization server 500 according to the present exemplary embodiment will be described with reference to flowcharts illustrated in FIGS. 16A and 16B. Further, processing performed by the web-hosted client 300 according to the present exemplary embodiment will be described with reference to a flowchart illustrated in FIG. 18.

Figure 16A:
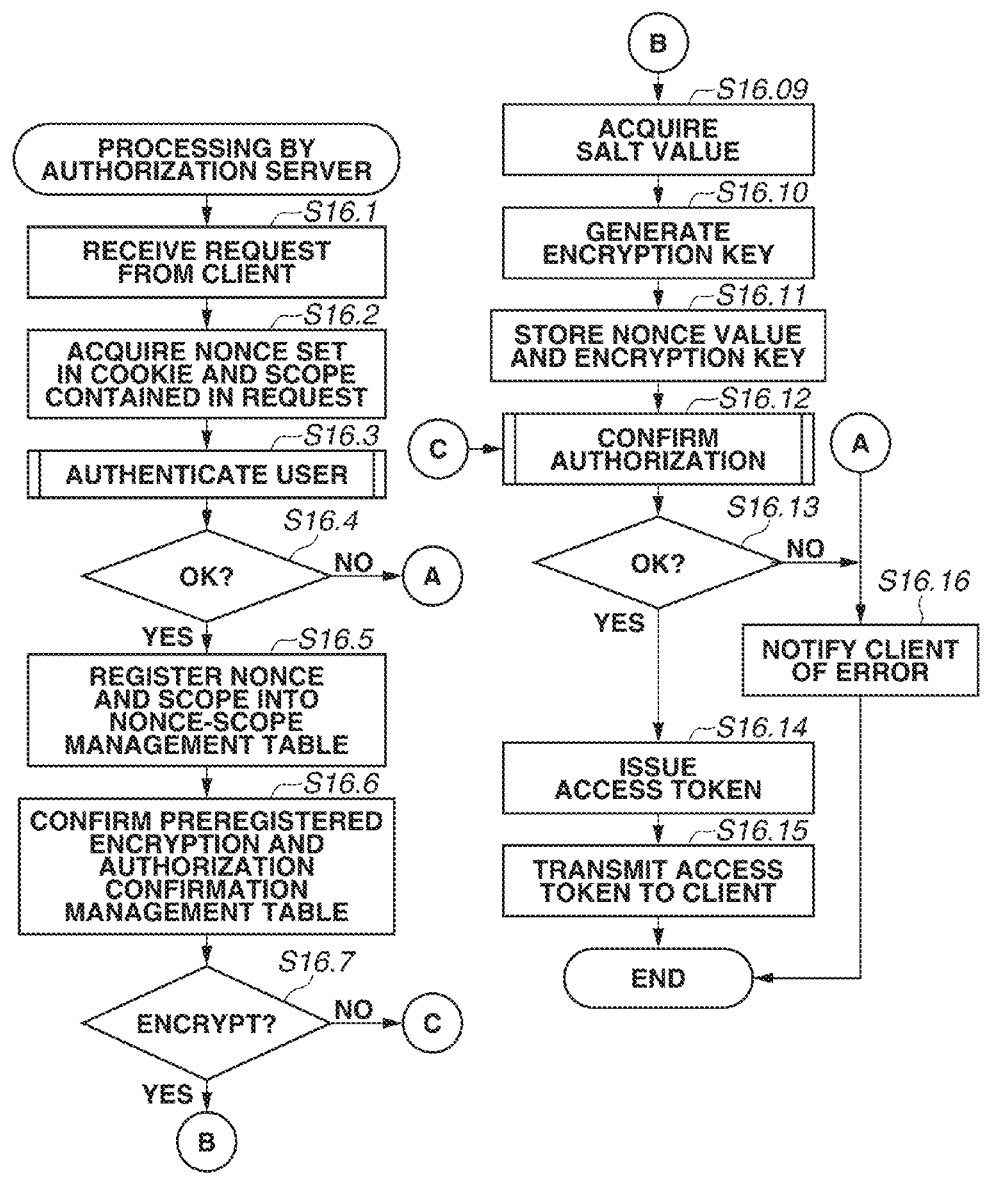

FIGS. 16A and 16B are flowcharts illustrating processing performed by the authorization server module 510 on the authorization server 500 when the authorization server 500 receives the request to authenticate the user and grant an authorization. In step S16.1, the authorization server module 510 receives the redirection request from the client PC 200, which triggers a start of the present flowchart. The authorization server module 510 returns the login screen 2000 illustrated in FIG. 6A to the browser on the client PC 200 to authenticate the user. In step S12.7, the user as the resource owner 1000 inputs the user ID and the password onto the login screen 2000 displayed on the browser on the client PC 200, thereby attempting a login.

In step S16.2, the authorization server 500 acquires the nonce value and the domain name from the cookie contained in the redirection request received from the client PC 200. Further, the authorization server 500 acquires the request parameter "scope". Further, in step S16.3, the authorization server 500 verifies whether the pair of the received user ID and password matches the information registered in the Table 1 (user management table). If the pair of the user ID and the password is not registered in the Table 1 (user management table) as a result of the verification (NO in step S16.4), in step S16.16, the authorization server 500 notifies the client PC 200 of the user authentication error screen (not illustrated), and then ends the processing. If the pair of the user ID and the password is registered in the Table 1 (user management table) as a result of the verification (YES in step S16.4), in step S16.5, the authorization server module 510 registers the nonce value and the scope previously acquired in step S16.2 into a Table 5 (nonce-scope management table), which will be described below.

Table 5 below is a data table that the authorization server 500 stores in the external memory. The present exemplary embodiment can be also configured in such a manner that this data table is stored in another server configured communicably via the LAN 101, instead of being stored in the external memory of the authorization server 500. The present exemplary embodiment is configured in such a manner that the authorization server 500 can generate, refer to, update, and delete Table 5 while the web-hosted client 300 can refer to Table 5, as the authorization server 500 and the web-hosted client 300 are connected to the same LAN 101.

TABLE 5

| NONCE-SCOPE MANAGEMENT TABLE | |
|---|---|
| NONCE | SCOPE |
| 871fe822-682f-4c42-af5a-4394e0e6b8f9 | scopeD |

Table 5 is the nonce-scope management table. This table includes the nonce value and the scope.

Next, in step S16.6, the authorization server module 510 refers to an encryption and authorization confirmation management table, which will be described below. Table 6 is a data table that the authorization server 500 stores in the external memory. The present exemplary embodiment can be also configured in such a manner that this data table is stored in another server configured communicably via the LAN 101, instead of being stored in the external memory of the authorization server 500. The present exemplary embodiment is configured in such a manner that the authorization server 500 connected to the same LAN can generate, refer to, update, and delete Table 6.

TABLE 6

| ENCRYPTION AND AUTHORIZATION CONFIRMATION MANAGEMENT TABLE | | |
|---|---|---|
| SCOPE | ENCRYPTION | AUTHORIZATION CONFIRMATION |
| scopeA | TRUE | TRUE |
| scopeB | TRUE | FALSE |
| scopeC | FALSE | TRUE |
| scopeD | FALSE | FALSE |

Table 6 is the encryption and authorization confirmation management table. This table includes the scope, the encryption, and the authorization confirmation. A scope character string, and Boolean values are stored in the scope column, and the encryption column and the authorization confirmation column, respectively. The respective Boolean values stored in the encryption column and the authorization confirmation column are expressed as "True", which indicates execution, or "False", which indicates omission. Assume that Table 6 is preset by an administrator of the authorization server 500. The authorization server 500 may be configured to allow this setting to be externally specified.

In the present exemplary embodiment, assume that the scope set into Table 5 in step S16.5 is "scopeD". In t step S16.6, the authorization server module 510 can confirm that both the encryption and the authorization confirmation are not supposed to be carried out by referring to Table 6. At this time, since the authorization server module 510 confirms that the encryption is not supposed to be carried out from Table 6 (NO in step S16.7), next, in step S16.12, the authorization server module 510 performs authorization confirmation processing. If the authorization server module 510 confirms that the encryption is supposed to be carried out at this time in step S16.7 (YES in step S16.7), the authorization server module 510 performs a similar series of processes for encrypting the access token to the processes indicated in steps S13.5 to S13.7 illustrated in FIG. 13A according to the third exemplary embodiment. In the present exemplary embodiment, steps S16.9 to S16.11 correspond to steps S13.5 to S13.7 illustrated in FIG. 13A, respectively, whereby descriptions thereof will be omitted here.

FIG. 16B is a flowchart illustrating the authorization confirmation processing performed in step S16.12 by the authorization server module 510 according to the present exemplary embodiment. In the present authorization confirmation processing, in step S16.16, the authorization server module 510 confirms the request parameters contained in the redirection request received from the client PC 200 in step S16.1. Further, in step S16.17, the authorization server module 510 acquires the scope contained in the request parameter, in particular, "scopeD" in the case of the present exemplary embodiment. At this time, in step S16.18, the authorization server module 510 refers to the Table 6 (encryption and authorization confirmation management table) to confirm whether the value of the request parameter "scope" contained in the redirection request is registered in the Table 6 (encryption and authorization confirmation management table).

If "False" is set as the value of the authorization confirmation in the Table 6 (encryption and authorization confirmation management table) that corresponds to the value of the request parameter "scope" contained in the redirection request at this time (YES in step S16.19), in step S16.20, the authorization server module 510 returns a success in the authorization confirmation without returning the authorization confirmation screen to the client PC 200. In the present exemplary embodiment, "False" is set as the value of the authorization confirmation in Table 6 that corresponds to "scopeD", whereby the authorization server module 510 returns the success in the authorization confirmation as described above. If the value of the request parameter "scope" contained in the redirection request is not registered in the Table 6 (encryption and authorization confirmation management table), or "True" is set as the value of the authorization confirmation at this time (NO in step S16.19), in step S16.21, the authorization server module 510 returns the authorization confirmation screen illustrated in FIG. 6B to the client PC 200. Then, the authorization server module 510 waits for a response from the client PC 200. If the authorization confirmation has failed (NO in step S16.22), in step S16.23, the authorization server module 510 returns a failure in the authorization confirmation, and then ends the processing. On the other hand, if the authorization confirmation has succeeded (YES in step S16.22), in step S16.20, the authorization server module 510 returns a success in the authorization confirmation, and then ends the processing.

Referring back to FIG. 16A, if the authorization confirmation has failed (NO in step S16.13) after the end of the authorization confirmation processing illustrated in FIG. 16B (step S16.12), in step S16.16, the authorization server module 510 notifies the client PC 200 of the user authorization error screen (not illustrated), and then ends the processing. If the authorization confirmation processing (step S16.12) has succeeded (YES in step S16.13), in step S16.14, the authorization server module 510 performs access token issue processing for generating the access token that allows access to the resource server 400.

The authorization server module 510 registers the generated access token into the Table 3 (token management table). More specifically, the authorization server module 510 stores an access token character string "AT_000002" into the token ID. Further, the authorization server module 510 stores an expiration date of the access token that is predetermined by the authorization server 500 into the expiration date. Further, the authorization server module 510 stores scope information and the user ID contained in a record of an authentication token already registered in the token table into the scope and the user ID, respectively. In this manner, in step S16.15, the authorization server 500 issues the access token "AT_000002" that allows resource access to the resource server 400 without requesting the user to explicitly confirm the authorization. This is because the web-hosted client 300, the resource server 400, and the authorization server 500 are connected to one another without being connected via the WAN 100. In the present exemplary embodiment, the LAN 101 is considered to be inside the premises, and the web-hosted client 300, the resource server 400, and the authorization server 500 are considered to belong to the same security domain.

The access token response transmitted from the authorization server module 510 to the client PC 200 at this time (corresponding to step S12.13 illustrated in FIG. 12) is configured according to the specification of OAuth 2.0 in the following manner. More specifically, the authorization server module 510 returns the response to the client PC 200 after adding, for example, the following parameters to the fragment component of the redirection URI with use of the "application/x-www-form-urlencoded" format.

HTTP/1.1 302 Found
Location:
http://client.example.com/cb#access
  token=AT_000002&state=xyz&token_type=
  example&expires_in=3600

In this manner, the parameters added to the access token response are "access_token", "token_type", "expires_in", "scope", and "state" according to the specification of OAuth 2.0. As described above, the access token response (corresponding to step S12.13 illustrated in FIG. 12) returned in the authorization flow according to the implicit grant, like the present exemplary embodiment, is set so as to be first redirected to the web-hosted client 300 to allow the web browser 230 on the client PC 200 to acquire the access token. In step S12.14 illustrated in FIG. 12, upon receiving the access token response, the web browser 230 on the client PC 200 redirects this access token response to the web-hosted client 300. At this time, this redirection does not contain the parameters in the fragment component according to the HTTP specification.

In step S12.16 illustrated in FIG. 12, upon receiving the redirection, the web-hosted client module 310 of the web-hosted client 300 returns the response containing a script that allows the web browser 230 on the client PC 200 to acquire the access token. Generally, this script is JavaScript (registered trademark) executable on the web browser 230, but may be another script executable on the browser. In step S12.17 illustrated in FIG. 12, upon receiving the script for acquiring the access token, the web browser 230 acquires the access token by executing the script (however, the web browser 230 does not decrypt the access token if the token is not encrypted, as will be described below). As a result, in step S12.18 illustrated in FIG. 12, the web browser 230 can access the resource server 400.

Figure 18:
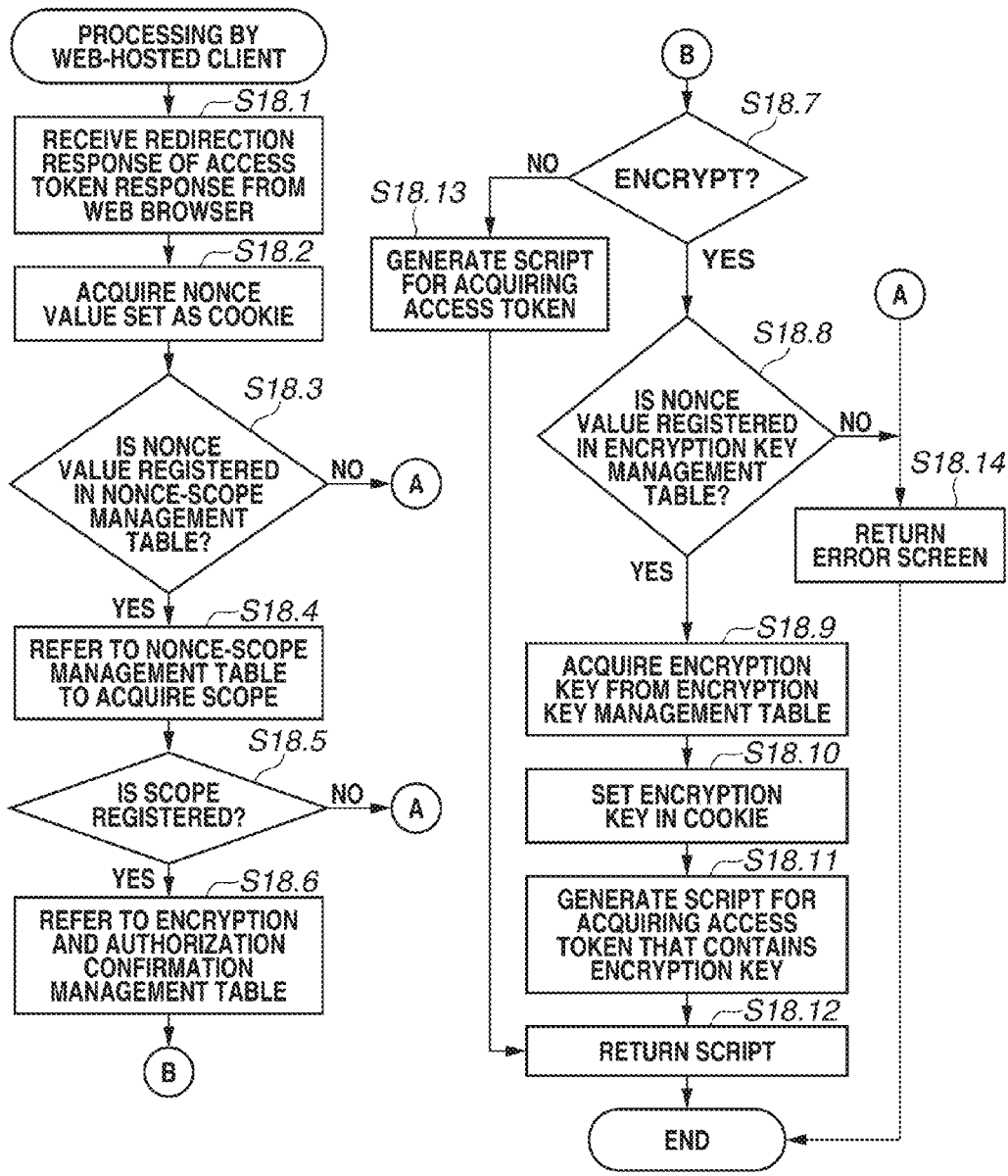
FIG. 18 is a flowchart illustrating processing performed by a web-hosted client according to the fourth exemplary embodiment.

FIG. 18 is a flowchart illustrating processing performed by the web-hosted client module 310 in steps S12.14 to S12.16. In step S18.1, the web-hosted client module 310 receives the redirection response from the web browser 230. Further, in step S18.2, the web-hosted client module 310 acquires the nonce value from the cookie parameter contained in the redirection HTTP communication. This nonce value is the value set in step S12.13. At this time, in step S18.3, the web-hosted client module 310 refers to the Table 5 (nonce-scope management table) to confirm whether the acquired nonce value is registered therein. If the nonce value is not registered in Table 5 (NO in step S18.3), in step S18.14, the web-hosted client module 310 generates the error screen (not illustrated) to transmit the generated error screen to the web browser 230, and then ends the processing. If the nonce value is registered in Table 5 (YES in step S18.3), in step S18.4, the web-hosted client module 310 acquires the scope corresponding to the matching nonce. If the scope corresponding to the nonce is not registered in the Table 5 (nonce-scope management table) at this time (NO in step S18.5), in step S18.14, the web-hosted client module 310 generates the error screen (not illustrated) to transmit the generated error screen to the web browser 230, and then ends the processing. If the scope corresponding to the nonce is registered in the Table 5 (nonce-scope management table) (YES in step S18.5), in step S18.6, the web-hosted client module 310 refers to the Table 6 (encryption and authorization confirmation management table) to confirm whether the scope is registered therein.

If the scope is not registered in the Table 6 (encryption and authorization confirmation management table), or "False" is set in the encryption column in Table 6 that corresponds to the scope at this time (NO in step S18.7), in step S18.13, the web-hosted client module 310 selects the script for acquiring the access token to access the resource server 400 as indicated in the flowchart illustrated in FIG. 7 according to the first exemplary embodiment. Then, in step S18.12, the web-hosted client module 310 transmits this script to the client PC 200, and then ends the processing. In the present exemplary embodiment, the scope in the sequence is "scopeD". Therefore, in step S18.13, the web-hosted client module 310 transmits the script for acquiring the access token set for the omission of the token encryption to access the resource server 400.

If the scope is registered in the Table 6 (encryption and authorization confirmation management table) with "True" set in the encryption column in Table 6 (YES in step S18.7), in step S18.8, the web-hosted client module 310 refers to the Table 4 (nonce-encryption key management table) to confirm whether the value of the acquired nonce is registered therein. Steps S18.9 to S18.12 and step S18.14 after that are similar to steps S14.4 to S14.7 and step S14.8 illustrated in FIG. 14, whereby descriptions thereof will be omitted here.

In this manner, the web-hosted client module 310 confirms the nonce value, which can prevent the web-hosted client module 310 from returning the encryption key regarding the decryption of the token and the script for acquiring the access token to a browser or the like unrelated to the series of processes. As a result, even if the unrelated browser or the like as described above steals the encrypted access token by fraud, the access to the web-hosted client 300 results in an error, which can prohibit the unrelated browser from decrypting the encrypted access token stolen by fraud, thereby preventing unauthorized access to the resource server 400.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-112627, filed May 30, 2014, which is hereby incorporated by reference herein in its entirety.

What is claimed is:

1. An authority transfer system including a server system having a service usable from a client and the client configured to use the service, the authority transfer system, wherein the server system includes memory device, and at least one processor coupled to the memory device, and the at least one processor having stored thereon instructions which, when executed by the at least one processor cause the authority transfer system to function as:

an authentication unit configured to determine whether a user is a valid user based on authentication information input from the user via an authentication screen displayed on the client;

an issue unit configured to issue authority information indicating that an authority of the user with respect to the service is transferred to the client, if the user determined to be the valid user by the authentication unit provides an instruction to permit a transfer of the authority of the user with respect to the service to the client via an authorization confirmation screen displayed on the client;

an authorization unit configured to authorize the client to use the service under the authority of the user based on the authority information transmitted when the client requests use of the service; and wherein the issue unit receives, from the client, a URL of an authorization endpoint of an authorizing server set as a parameter of a redirect request by the service and further receives an authorization request including a Cookie in which a domain name of the service is set, and a) in a case where a domain name determined from the URL of the endpoint is not the same as the domain name of the service included in the Cookie, provides the authorization confirmation screen to the client and, based on the instruction to permit a transfer of the authority of the user with respect to the service to the client having been provided by the user, issues the authority information and, b) in a case where the domain name determined from the URL of the endpoint is the same as the domain name of the service, issues the authority information without providing the authorization confirmation screen to the client, wherein the authorization endpoint is a web-hosted client configured to generate a script for causing the client that is the web browser to acquire the authority information, and wherein in a case where the client is the web browser, the web browser acquires the script from the web-hosted client and acquires the authority information according to the script, and in a case where the client is not the web browser, the client that is not the web browser cancels redirection of a response to the authority information to the web-hosted client and acquires the authority information from a URL included in the authority information.

2. The authority transfer system according to claim 1, wherein the client is an application that is not a web browser, and the endpoint indicates an address of a host unit configured to generate a script that allows the client to acquire the authority information, and
wherein the application acquires the authority information without accessing the host unit.

3. The authority transfer system according to claim 1, wherein the client is a web browser, and the endpoint indicates an address of a host unit configured to generate a script that allows the client to acquire the authority information, and
wherein the web browser acquires the authority information, which is stored in a memory device included in the client before the web browser accesses the host unit, according to the script generated by the host unit, and transmits the acquired authority information to the service when requesting the use of the service.

4. The authority transfer system according to claim 2, wherein the issue unit generates an encryption key based on a unique ID, encrypts the authority information based on the generated encryption key, and transmits the encrypted authority information and the unique ID to the client, and
wherein the host unit generates a script for decrypting the encrypted authority information and transmits the generated script to the client, if a unique ID transmitted from the client matches the unique ID associated with the authority information encrypted by the issue unit.

5. The authority transfer system according to claim 1, wherein the authorization unit does not authorize the client to use the service, if an authority required to use the service requested by the client is determined to be not within a range of the authority of the user transferred to the client that is identified from the authority information.

6. A method performed by an authority transfer system including a server system having a service usable from a client and the client configured to use the service, the method, wherein the server system includes memory device, and at least one processor coupled to the memory device, and the at least one processor having stored thereon instructions which, when executed by the at least one processor cause the authority transfer system to function as:
determining, by an authentication unit, whether a user is a valid user based on authentication information input from the user via an authentication screen displayed on the client;
issuing, by an issue unit, authority information indicating that an authority of the user with respect to the service is transferred to the client, if the user determined to be the valid user by the authentication unit provides an instruction to permit a transfer of the authority of the user with respect to the service to the client via an authorization confirmation screen displayed on the client;
authorizing, by an authorization unit, the client to use the service under the authority of the user based on the authority information transmitted when the client requests use of the service; and
wherein the issue unit receives, from the client, a URL of an authorization endpoint of an authorizing server set as a parameter of a redirect request by the service and further receives an authorization request including a Cookie in which a domain name of the service is set, and a) in a case where a domain name determined from the URL of the endpoint is not the same as the domain name of the service included in the Cookie, provides the authorization confirmation screen to the client and, based on the instruction to permit a transfer of the authority of the user with respect to the service to the client having been provided by the user, issues the authority information and, b) in a case where the domain name determined from the URL of the endpoint is the same as the domain name of the service, issues the authority information without providing the authorization confirmation screen to the client,
wherein the authorization endpoint is a web-hosted client configured to generate a script for causing the client that is the web browser to acquire the authority information, and
wherein in a case where the client is the web browser, the web browser acquires the script from the web-hosted client and acquires the authority information according to the script, and in a case where the client is not the web browser, the client that is not the web browser cancels redirection of a response to the authority information to the web-hosted client and acquires the authority information from a URL included in the authority information.

7. The method according to claim 6, wherein the client is an application that is not a web browser, and the endpoint indicates an address of a host unit configured to generate a script that allows the client to acquire the authority information, and
wherein the application acquires the authority information without accessing the host unit.

8. The method according to claim 6, wherein the client is a web browser, and the endpoint indicates an address of a host unit configured to generate a script that allows the client to acquire the authority information, and
wherein the web browser acquires the authority information, which is stored in a memory device included in the client before the web browser accesses the host unit, according to the script generated by the host unit, and transmits the acquired authority information to the service when requesting the use of the service.

9. The method according to claim 7, further comprising, generating, by the issue unit, an encryption key based on a unique ID, encrypts the authority information based on the generated encryption key, and transmits the encrypted authority information and the unique ID to the client, and
generating, by the host unit, a script for decrypting the encrypted authority information and transmits the generated script to the user, if a unique ID transmitted from the client matches the unique ID associated with the authority information encrypted by the issue unit.

10. The method according to claim 6, wherein the authorization unit does not authorize the client to use the service, if an authority required to use the service requested by the client is determined to be not within a range of the authority of the user transferred to the client that is identified from the authority information.

11. An authentication server system communicable with a server system having a service usable from a client and the client configured to use the service, the authentication server system, wherein the server system includes memory device, and at least one processor coupled to the memory device, and the at least one processor having stored thereon instructions which, when executed by the at least one processor cause the authentication server system to function as:
an authentication unit configured to determine whether a user is a valid user based on authentication information input from the user via an authentication screen displayed on the client;
an issue unit configured to issue authority information indicating that an authority of the user with respect to the service is transferred to the client, if the user determined to be the valid user by the authentication unit provides an instruction to permit a transfer of the authority of the user with respect to the service to the client via an authorization confirmation screen displayed on the client;
an authorization unit configured to authorize the client to use the service under the authority of the user based on the authority information transmitted when the client requests use of the service; and
wherein the issue unit receives, from the client, a URL of an authorization endpoint of an authorizing server set as a parameter of a redirect request by the service and further receives an authorization request including a Cookie in which a domain name of the service is set, and a) in a case where a domain name determined from the URL of the endpoint is not the same as the domain name of the service included in the Cookie, provides the authorization confirmation screen to the client and, based on the instruction to permit a transfer of the authority of the user with respect to the service to the client having been provided by the user, issues the authority information and, b) in a case where the domain name determined from the URL of the endpoint is the same as the domain name of the service, issues the authority information without providing the authorization confirmation screen to the client,
wherein the authorization endpoint is a web-hosted client configured to generate a script for causing the client that is the web browser to acquire the authority information, and
wherein in a case where the client is the web browser, the web browser acquires the script from the web-hosted client and acquires the authority information according to the script, and in a case where the client is not the web browser, the client that is not the web browser cancels redirection of a response to the authority information to the web-hosted client and acquires the authority information from a URL included in the authority information.

* * * * *